United States Patent
Chuang et al.

(10) Patent No.: US 11,573,668 B2
(45) Date of Patent: Feb. 7, 2023

(54) TOUCH-SENSING PANEL

(71) Applicant: HannStar Display Corporation, Taipei (TW)

(72) Inventors: Yao-Chih Chuang, Tainan (TW); Mei-Ling Chou, Tainan (TW); Ming-Liang Chen, Tainan (TW); Chih-Wei Chen, Tainan (TW); Chia-Yu Liu, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 17/511,580

(22) Filed: Oct. 27, 2021

(65) Prior Publication Data
US 2022/0155902 A1 May 19, 2022

(30) Foreign Application Priority Data
Nov. 17, 2020 (CN) .......................... 202011287083.9

(51) Int. Cl.
*G06F 3/044* (2006.01)
*G06F 3/041* (2006.01)
*G02F 1/1333* (2006.01)

(52) U.S. Cl.
CPC .......... *G06F 3/0443* (2019.05); *G06F 3/0412* (2013.01); *G06F 3/0446* (2019.05); *G02F 1/13338* (2013.01); *G06F 2203/04111* (2013.01); *G06F 2203/04112* (2013.01)

(58) Field of Classification Search
CPC .... G06F 3/0443; G06F 3/0412; G06F 3/0446; G06F 2203/04111; G06F 2203/04112; G02F 1/13338
See application file for complete search history.

(56) References Cited

U.S. PATENT DOCUMENTS

| | | | | |
|---|---|---|---|---|
| 2014/0333855 | A1* | 11/2014 | Park | G06F 3/045 349/12 |
| 2015/0346874 | A1* | 12/2015 | Park | G06F 3/0446 345/174 |
| 2016/0109980 | A1* | 4/2016 | Lee | G02F 1/13338 349/12 |
| 2020/0033976 | A1* | 1/2020 | Yin | G02F 1/134309 |
| 2020/0356258 | A1* | 11/2020 | Liu | G06F 3/0416 |
| 2022/0147170 | A1* | 5/2022 | Park | G06F 3/046 |

* cited by examiner

*Primary Examiner* — Md Saiful A Siddiqui
(74) *Attorney, Agent, or Firm* — JCIPRNET

(57) ABSTRACT

The disclosure provides a touch-sensing panel, which includes a substrate, a first mesh pattern, an insulating layer, and a second mesh pattern. The substrate has an active area and a peripheral area. The first mesh pattern is located in the active area. The insulating layer is disposed on the first mesh pattern. The second mesh pattern is located in the active area. At least a part of the second mesh pattern is disposed on the insulating layer. Each of the first mesh pattern and the second mesh pattern includes a plurality of mesh lines. A reflectivity of a surface of one of the first mesh pattern and the second pattern is smaller than a reflectivity of a surface of the other of the first mesh pattern and the second mesh pattern, and a width of each of the mesh lines of the one of the first mesh pattern and the second mesh pattern is smaller than a width of each of the mesh lines of the other of the first mesh pattern and the second mesh pattern.

12 Claims, 15 Drawing Sheets

TOUCH-SENSING PANEL

CROSS-REFERENCE TO RELATED APPLICATION

This application claims the priority benefit of china application no. 202011287083.9, filed on Nov. 17, 2020. The entirety of the above-mentioned patent application is hereby incorporated by reference herein and made a part of this specification.

BACKGROUND

Technical Field

The disclosure relates to a sensing panel, in particular to a touch-sensing panel.

Description of Related Art

In recent years, people's dependence on electronic products has increased. Input devices of a lot of informational products have been transformed from traditional keyboards or mice to touch panels to enable the products to be more convenient, smaller, lighter, and more user-friendly. Among the existing touch panels, a display panel with a touch function has become a standard equipment of today's mobile devices. A capacitive touch technology has become a mainstream of today's touch technology and is widely used in related electronic products (such as mobile phones, tablets, and smart watches) based on its fast response, high reliability, and high durability.

Generally, a touch electrode layer of a touch display panel is disposed on a side of the display panel that is closer to users to facilitate sensing of the users' touch by the touch electrodes. In order to reduce the visibility of the touch electrode layer, a touch electrode layer that uses a blackened metal has been proposed. However, the blackened metal increases the impedance of a bonding pad of a touch sensing substrate that is used to electrically connect to a circuit board. Thus, a decrease in the production yield may occur.

SUMMARY

The disclosure relates to a touch-sensing panel with a low visibility of touch electrodes and a high bonding yield of a circuit board thereof.

A touch-sensing panel according to an embodiment of the disclosure includes a substrate, a first mesh pattern, an insulating layer, and a second mesh pattern. The substrate has an active area and a peripheral area. The first mesh pattern is located in the active area. The insulating layer is disposed on the first mesh pattern. The second mesh pattern is located in the active area. At least a part of the second mesh pattern is disposed on the insulating layer. Each of the first mesh pattern and the second mesh pattern includes multiple mesh lines. A reflectivity of a surface of one of the first mesh pattern and the second pattern is smaller than a reflectivity of a surface of the other of the first mesh pattern and the second mesh pattern, and a width of each of the mesh lines of the one of the first mesh pattern and the second mesh pattern is greater than a width of the mesh lines of the other of the first mesh pattern and the second mesh pattern.

In a touch-sensing panel according to an embodiment of the disclosure, the reflectivity of the surface of the first mesh pattern is smaller than the reflectivity of the surface of the second mesh pattern. The width of each of the mesh lines of the first mesh pattern is greater than the width of each of the mesh lines of the second mesh pattern.

In a touch-sensing panel according to an embodiment of the disclosure, each of the mesh lines of the first mesh pattern includes a first metal layer and a low-reflectivity layer. The low-reflectivity layer is located between the first metal layer and the substrate. Each of the mesh lines of the second mesh pattern includes a second metal layer. A reflectivity of the low-reflectivity layer is smaller than a reflectivity of a surface of the first metal layer that faces the substrate and a reflectivity of a surface of the second metal layer that faces the insulating layer.

In an embodiment according to the disclosure, when a user performs a touch operation on the touch-sensing panel, the user is located on a side of the substrate that faces away from the first mesh pattern and the second mesh pattern.

In an embodiment according to the disclosure, the reflectivity of the surface of the second mesh pattern is smaller than the reflectivity of the surface of the first mesh pattern. The width of each of the mesh lines of the second mesh pattern is greater than the width of each of the mesh lines of the first mesh pattern.

In a touch-sensing panel according to an embodiment of the disclosure, each of the mesh lines of the first mesh pattern includes a first metal layer. Each of the mesh lines of the second mesh pattern includes a second metal layer and a low-reflectivity layer. The second metal layer is located between the low-reflectivity layer and the insulating layer. A reflectivity of the low-reflectivity layer is smaller than a reflectivity of a surface of the first metal layer that faces away from the substrate and a reflectivity of a surface of the second metal layer that faces away from the insulating layer.

In a touch-sensing panel according to an embodiment of the disclosure, the surface of the second mesh lines is a surface of the low-reflectivity layer, and the surface of the first mesh lines is the surface of the first metal layer.

In an embodiment according to the disclosure, when a user performs a touch operation on the touch-sensing panel, the user is located on a side of the substrate where the first mesh pattern and the second mesh pattern are disposed.

In a touch-sensing panel according to an embodiment of the disclosure, the low-reflectivity layer is a metal oxide layer.

In a touch-sensing panel according to an embodiment of the disclosure, a material of the low-reflectivity layer includes molybdenum, copper, aluminum, silver, tantalum or a combination thereof.

In a touch-sensing panel according to an embodiment of the disclosure, the mesh lines of the first mesh pattern form multiple first touch electrodes, and the mesh lines of the second mesh pattern form multiple second touch electrodes.

In a touch-sensing panel according to an embodiment of the disclosure, the mesh lines of the first mesh pattern form multiple first touch electrodes, multiple second touch electrodes, and multiple connecting lines. The mesh lines of the second mesh pattern form multiple bridging lines. Two of the first touch electrodes that are adjacent to each other are electrically connected to each other via at least one of the connecting lines, and two of the second touch electrodes that are adjacent to each other are electrically connected to each other via at least one of the bridging lines.

In summary, in a touch-sensing panel of an embodiment of the disclosure, multiple first mesh lines and multiple second mesh lines are disposed on the substrate. When a reflectivity of a surface of the first mesh lines that faces the substrate is smaller than a reflectivity of a surface of the second mesh lines that faces the substrate, each width of the second mesh lines is smaller than each width of the first mesh lines. Conversely, when a reflectivity of a surface of the second mesh lines that faces away from the substrate is smaller than a reflectivity of a surface of the first mesh lines that faces away from the substrate, each of the widths of the first mesh lines is smaller than each of the widths of the second mesh lines. Accordingly, a low visibility of mesh patterns may be ensured, and a test yield of the touch-sensing panel and a bonding yield of the circuit board may be facilitated.

DESCRIPTION OF THE EMBODIMENTS

Figure 1:
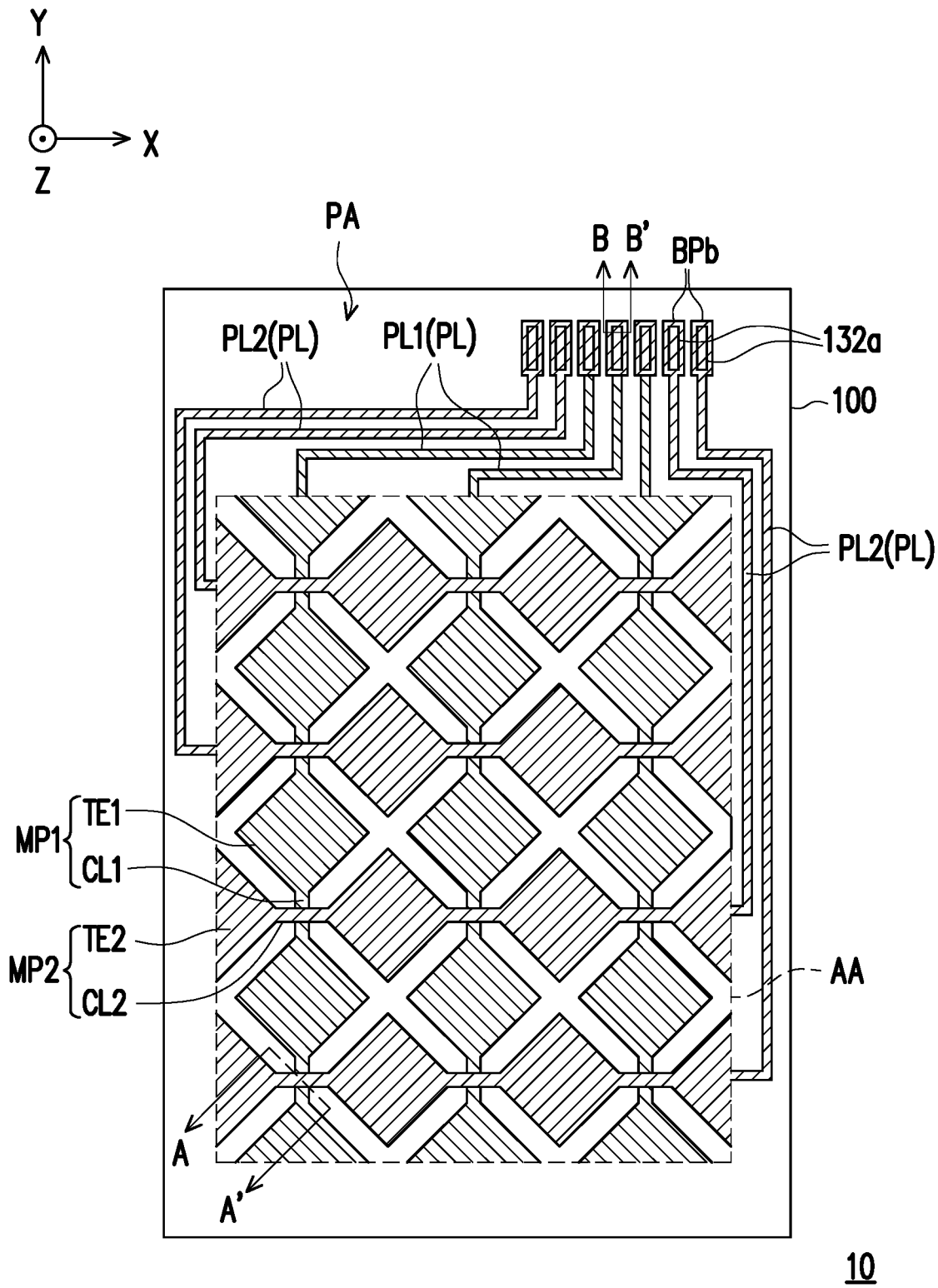
FIG. 1 is a schematic front view of a touch-sensing panel according to a first embodiment of the disclosure.

Details are given below with reference to exemplary embodiments of the disclosure, and instances of the exemplary embodiments are illustrated in the accompanying drawings. Whenever possible, the same component symbols used in the drawings and descriptions indicate the same or similar parts.

Figure 2:
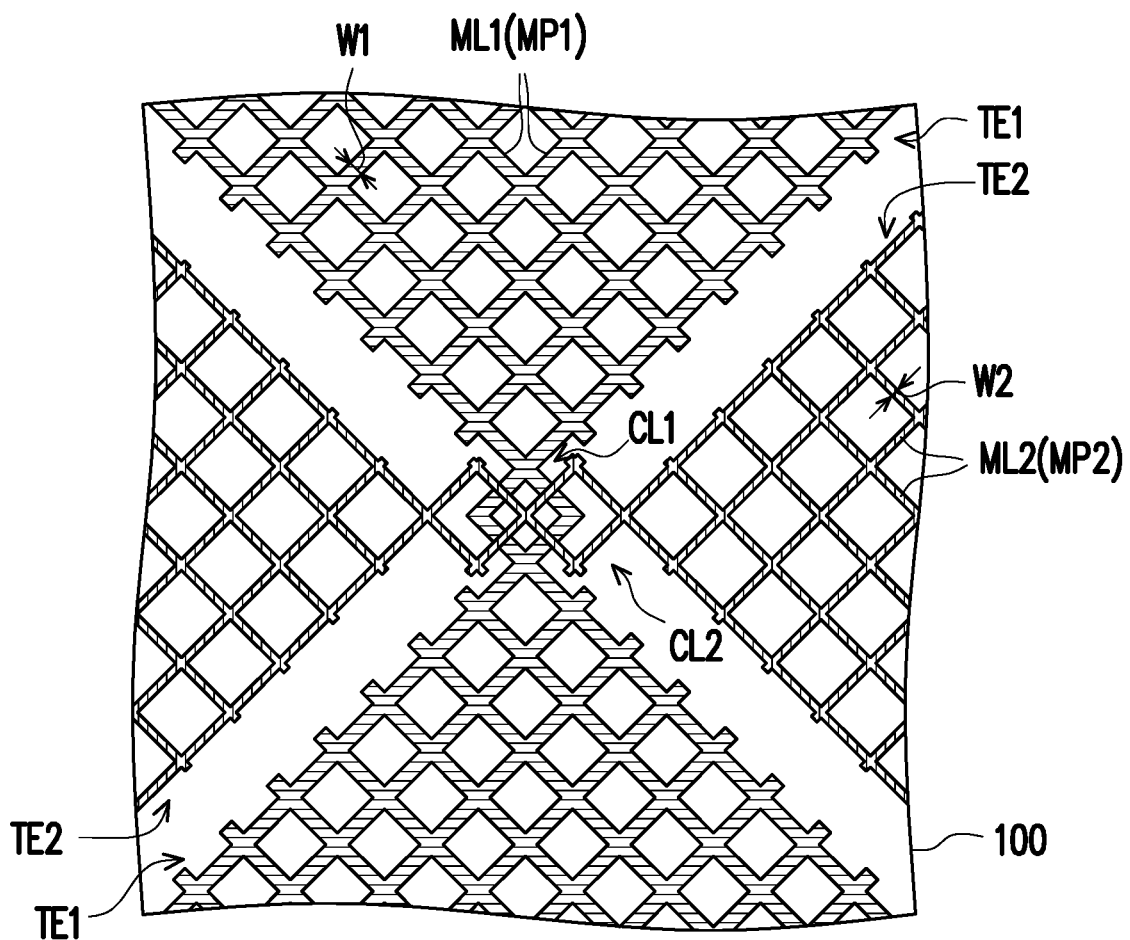
FIG. 2 is an enlarged schematic view of a partial area of the touch-sensing panel in FIG. 1.
Figure 3:
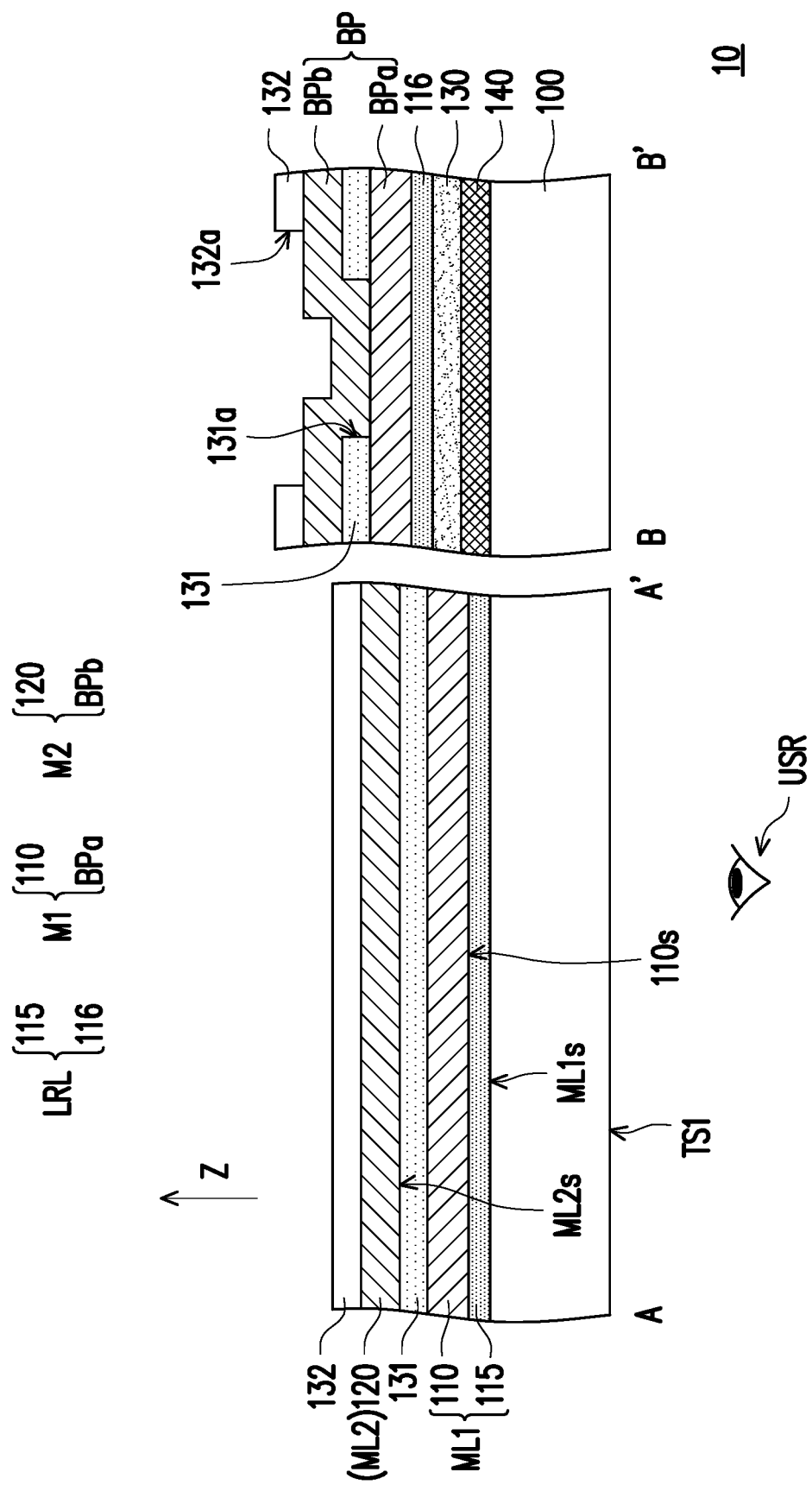
FIG. 3 is a schematic cross-sectional view of the touch-sensing panel of FIG. 1.
Figure 4B:
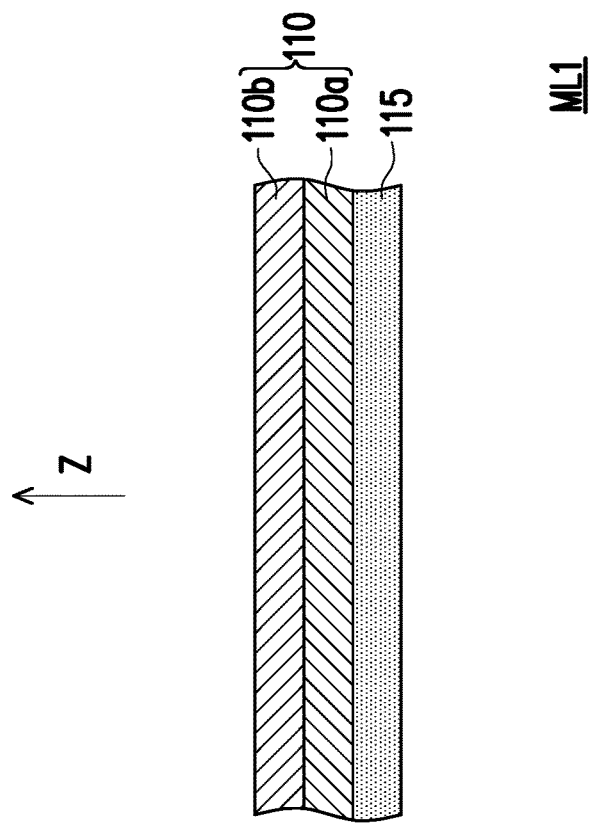
FIGS. 4A and 4B are enlarged schematic views of first mesh lines and second mesh lines of FIG. 3 respectively.
Figure 4A:
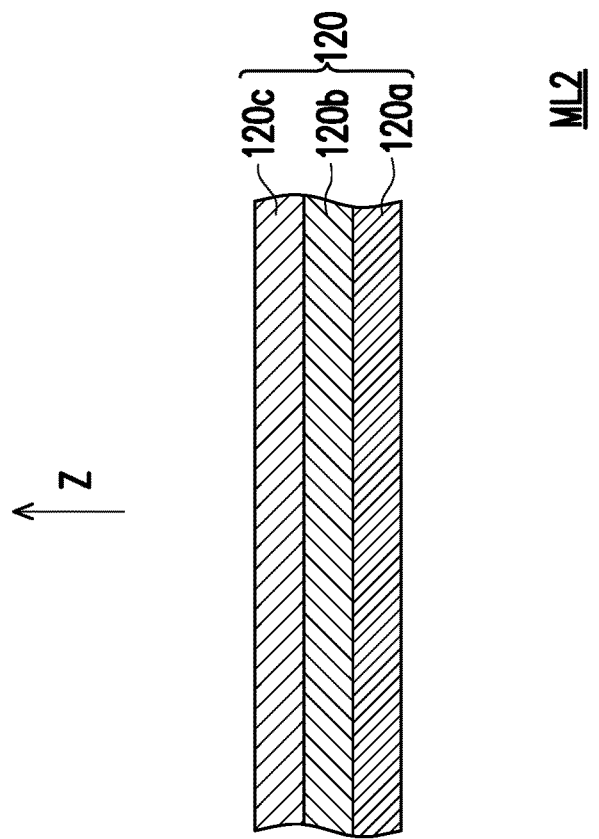

FIG. 1 is a schematic front view of a touch-sensing panel of a first embodiment of the disclosure. FIG. 2 is an enlarged schematic view of a partial area of the touch-sensing panel in FIG. 1. FIG. 3 is a schematic cross-sectional view of the touch-sensing panel in FIG. 1. FIGS. 4A and 4B are enlarged schematic views of first mesh lines and second mesh lines of FIG. 3 respectively. It is to be noted that FIG. 3 corresponds to a sectional line A-A' and a sectional line B-B' of FIG. 1. For a clear illustration, FIG. 1 omits a light shielding pattern layer 140 and an insulating layer 130 of FIG. 3, and FIG. 2 only shows a substrate, the first mesh pattern and the second mesh pattern of FIG. 3.

Referring to FIGS. 1 to 3, a touch-sensing panel 10 includes a substrate 100, a first mesh pattern MP1, a second mesh pattern MP2, and insulating layers 131, 132. The substrate 100 has an active area AA and a peripheral area PA. The substrate 100 may be a rigid substrate or a flexible substrate. The material of the substrate 100 includes glass, quartz, polyimide (PI), polyethylene terephthalate (PET), polymer matrix, or other suitable materials. The first mesh pattern MP1 and the second mesh pattern MP2 are sequentially disposed on the substrate 100 and located in the active area AA. In this embodiment, the insulating layer 131 is disposed between the first mesh pattern MP1 and the second mesh pattern MP2, and is used to enable the first mesh pattern MP1 to be electrically insulated from the second mesh pattern MP2, but the disclosure is not limited thereto. The insulating layer 132 is disposed on the second metal layer 120. The material of each of the insulating layers 131, 132 includes inorganic materials (such as silicon oxide, silicon nitride, silicon oxynitride, other suitable materials, or a stacked layer of at least two of the foregoing materials), organic materials, or other suitable materials, or a combination of the foregoing materials.

In this embodiment, the first mesh pattern MP1 includes multiple first touch electrodes TE1 and multiple connecting lines CL1, and the first touch electrodes TE1 and the connecting lines CL1 are arranged to form multiple first touch electrode strings each extending on a direction Y, and two adjacent first touch electrodes TE1 of the first touch electrode string are electrically connected via the connecting line CL1. The second mesh pattern MP2 includes multiple second touch electrodes TE2 and multiple connecting lines CL2, and the second touch electrodes TE2 and the connecting lines CL2 are arranged to form multiple second touch electrode strings each extending on a direction X, and two adjacent second touch electrodes TE2 of the second touch electrode string are electrically connected via the connecting line CL2. The direction X and the direction Y intersect each other. Specifically, the extending direction of the first touch electrode string may be perpendicular to the extending direction of the second touch electrode string, but the extending directions of the first touch electrode string and the second touch electrode string are not limited thereto. The first touch electrodes TE1 do not overlap the second touch electrodes TE2 in a direction perpendicular to the substrate 100 (for example, a direction Z).

For example, in this embodiment, one and the other of the first touch electrode TE1 and the second touch electrode TE2 are, for example, a reception (Rx) electrode and a transmission (Tx) electrode, respectively, but the disclosure is not limited thereto. In other embodiments, the disposition of the reception electrode and the transmission electrode may be adjusted according to different design needs (such as a position of a touch surface). On the other hand, in this embodiment, an example is given in which the number of the connecting lines (the connecting lines CL1 or the connecting lines CL2) between any two of the touch electrodes that are adjacent to each other (such as two adjacent first touch electrodes TE1 of the first touch electrode string or two adjacent second touch electrodes TE2 of the second touch electrode string) is one for illustrative description, and the number of the connecting lines is not limited thereto. In other embodiments, the number of the connecting lines between any two of the touch electrodes that are adjacent to each other may also be adjusted to be two or more according to actual electrical property needs.

Furthermore, the first mesh pattern MP1 includes multiple first mesh lines ML1, and each of some of the first mesh lines ML1 and each of another some of the first mesh lines ML1 respectively extend two directions that are non-parallel and non-perpendicular to the direction X and direction Y to form the first mesh pattern MP1. Similarly, the second mesh pattern MP2 includes multiple second mesh lines ML2, and each of some of the second mesh lines ML2 and each of another some of the second mesh lines ML2 respectively extend on two directions that are non-parallel and non-perpendicular to the direction X and the direction Y to form the second mesh pattern MP2. However, the extending directions of the first mesh lines ML1 and the second mesh lines ML2 are not limited thereto. In other words, the touch electrodes (such as the first touch electrodes TE1 and the second touch electrodes TE2) and the connecting lines (for example, the connecting lines CL1 and the connecting lines CL2) are formed by the mesh lines.

In this embodiment, the touch-sensing panel 10 has a touch surface TS1 that a user USR faces when the user USR performs a touch operation on the touch-sensing panel 10, the touch surface TS1 of the touch-sensing panel 10 is located on a side of the substrate 100 that faces away from the first and second mesh pattern MP1, MP2 (i.e. faces away from the first and second mesh lines ML1, ML2). In other words, the user USR is located on the lower side of the substrate 100 in FIG. 3 to perform touch operations.

It is to be noted that a reflectivity of a surface ML1s of the first mesh line ML1 that faces the substrate 100 and the user USR may be smaller than a reflectivity of a surface ML2s of the second mesh line ML2 that faces the substrate 100 and the user USR. Specifically, in this embodiment, the first mesh line ML1 includes a first metal layer 110 and a low-reflectivity layer 115. The low-reflectivity layer 115 is located between the first metal layer 110 and the substrate 100, and a reflectivity of the low-reflectivity layer 115 is smaller than a reflectivity of the first metal layer 110. Specifically, the reflectivity of the low-reflectivity layer 115 is smaller than a reflectivity of a surface 110s of the first metal layer 110 that faces the substrate 100 and the user USR. In this embodiment, a low-reflectivity layer 115 with the reflectivity smaller than the reflectivity of the first metal layer 110 is disposed on the surface 110s of the first metal layer 110 that faces the substrate 100 and the user USR, so as to prevent the user USR from seeing the first mesh pattern MP1 due to light reflection. Therefore, a concealment of the first mesh pattern MP1 may be facilitated. A "low reflectivity" of the low-reflectivity layer 115 means that the reflectivity of the low-reflectivity layer 115 is smaller than the reflectivity of the first metal layer 110. For example, the reflectivity of the first metal layer 110 is X %, the reflectivity of the low-reflectivity layer 115 is Y %, X is greater than 0 and less than or equal to 100, and Y is greater than or equal to 0 and less than X. The second mesh line ML2 includes a second metal layer 120. The reflectivity of the low-reflectivity layer 115 is smaller than a reflectivity of the second metal layer 120. Specifically, the reflectivity of the low-reflectivity layer 115 is smaller than a reflectivity of a surface of the second metal layer 120 that faces the substrate 100 and the user USR. As shown in FIG. 3, the surface ML1s of the first mesh line ML1 is the surface of the low-reflectivity layer 115 that faces the substrate 100 and the user USR, and the surface ML2s of the second mesh line ML2 is the surface of the second metal layer 120 that faces the substrate 100 and the user USR. The surface ML1s of the first mesh line ML1 and the surface ML2s of the second mesh line ML2 may be referred to as the surface ML1s of the first mesh pattern MP1 and the surface ML2s of the second mesh pattern MP2, respectively. Further description of a reflectivity of the surface ML1s of the first mesh line ML1 that faces of the substrate 100 being smaller than a reflectivity of the surface ML2s of the second mesh line ML2 that faces of the substrate 100 may be found in the description of bonding pads BP of peripheral lines PL1 in FIG. 1 in the following.

In this embodiment, a color of the surface (that is, the surface ML1s) of the low-reflectivity layer 115 may be dark, such as black, but is not limited thereto. For example, the low-reflectivity layer 115 may be a metal oxide layer, and the metal material of the metal oxide layer may be selected from molybdenum, copper, aluminum, silver, tantalum, or a combination thereof, but is not limited thereto. For example, the metal oxide layer may be molybdenum oxide or molybdenum tantalum oxide, but is not limited thereto. Since the color of the surface ML1s of the first mesh line ML1 that faces the user USR is dark (such as black), the visibility of the first mesh lines ML1 may be reduced.

On the other hand, the first metal layer 110 of the first mesh line ML1 may be a stacked structure of a metal material layer 110a and a metal material layer 110b (as shown in FIG. 4A). For example, the metal material layer 110a and the metal material layer 110b may be an aluminum layer and a molybdenum layer respectively, but are not limited thereto. The second metal layer 120 of the second mesh line ML2 may be a stacked structure of a metal material layer 120a, a metal material layer 120b, and a metal material layer 120c (as shown in FIG. 4B). For example, the metal material layer 120a, the metal material layer 120b, and the metal material layer 120c may be a molybdenum layer, an aluminum layer, and a molybdenum layer, respectively, but are not limited thereto. As mentioned above, the reflectivity of the low-reflectivity layer 115 is smaller than the reflectivity of the surface 110s of the first metal layer 110 that faces the substrate 100 and the user USR and the reflectivity of the surface (that is, the surface ML2s of the second mesh lines ML2) of the second metal layer 120 that faces the substrate 100 and the user USR. Specifically, since the metal material layer 110a is the metal material layer in the first metal layer 110 that faces the user USR, and the metal material layer 120a is the metal material layer in the second metal layer 120 that faces the user USR, the reflectivity of the low-reflectivity layer 115 is smaller than a reflectivity of the metal material layer 110a in the first metal layer 110 and a reflectivity of the metal material layer 120a in the second metal layer 120. In other embodiments, one and the other of the first metal layer 110 and the second metal layer 120 may be a multi-layer stacked structure having multiple metal material layers and a single-layer structure having a metal material layer respectively, or each of the first metal layer 110 and the second metal layer 120 may be the single-layer structure. In summary, when each of the first metal layer 110 and the second metal layer 120 is the multi-layer stacked structure having multiple metal material layers, the reflectivity of the low-reflectivity layer 115 is smaller than a reflectivity of the metal material layer in the first metal layer 110 that faces the user USR and a reflectivity of the metal material layer in the second metal layer 120 that faces the user USR; when each of the first metal layer 110 and the second metal layer 120 is the single-layer structure having the single metal material layer, the reflectivity of the reflectivity layer 115 is smaller than the reflectivity of the first metal layer 110 and the reflectivity of the second metal layer 120; when the first metal layer 110 and the second metal layer 120 is the multi-layer stacked structure having multiple metal material layers and the single layer structure having the single metal material layer respectively, or when the first metal layer 110 and the second metal layer 120 are the single-layer structure having the single metal material layer and the multi-layer stack structure having multiple metal material layers respectively, the reflectivity of the low-reflectivity layer 115 is smaller than the reflectivity of the metal material layer in the first metal layer 110 that faces the user USR and the reflectivity of the second metal layer 120, or smaller than the reflectivity of the first metal layer 110 and a reflectivity of the metal material layer of the second metal layer 120 that faces the user USR.

Since a reflectivity of the surface ML2s of the second mesh line ML2 that faces the user USR is greater than a reflectivity of the surface ML1s of the first mesh line ML1 that faces the user USR, in this embodiment, a width W2 of the second mesh line ML2 is optionally smaller than a width W1 of the first mesh line ML1, so that the visibility of the second mesh lines ML2 may be reduced. Therefore, a concealment of the second mesh pattern MP2 may be facilitated. That is, by disposing the low-reflectivity layer 115 on a side, which faces the user USR, of the first mesh line ML1 that are closer to the user USR and reducing the line width of the second mesh line ML2 that are farther from the user USR, the concealment of the first mesh pattern MP1 and the second mesh pattern MP2 may be facilitated.

It is to be noted that in this embodiment, an example is given in which a number of the metal material layers of the first metal layer 110 and a number of the metal material layers of the second metal layer 120 are two and three respectively for illustrative description. The example does not mean that the disclosure is limited by the content disclosed in the drawings. In other embodiments, the number of the metal material layers of the first metal layer 110 and the number of the metal material layers of the second metal layer 120 may be adjusted according to actual electrical property or manufacturing process needs.

Furthermore, the touch-sensing panel 10 also includes multiple peripheral lines PL and multiple bonding pads BP, which are disposed on the substrate 100 and located in the peripheral area PA. Each of the first touch electrode strings and second touch electrode strings is electrically connected to a corresponding one of the bonding pads BP via a corresponding one of the peripheral lines PL. For example, the first touch electrode strings including the first touch electrodes TE1 and the connecting lines CL1 are electrically connected to some of the bonding pads BP via the peripheral lines PL1, and the second touch electrode strings including the second touch electrodes TE2 and the connecting lines CL2 are electrically connected to another some of the bonding pads BP via multiple peripheral lines PL2.

Specifically, the bonding pad BP that is electrically connected to the peripheral line PL1 includes a first conductive portion BPa and a second conductive portion BPb that are electrically connected to each other. The first conductive portion BPa is located between the second conductive portion BPb and the substrate 100. The low-reflectivity layer 116 is located between the first conductive portion BPa and the substrate 100. The insulating layer 131 has multiple contact holes 131a each overlapping a corresponding bonding pad BP and exposing at least a part of the first conductive portion BPa of the corresponding bonding pad BP, and the second conductive portion BPb contacts the first conductive portion BPa via the contact hole 131a. The insulating layer 132 has multiple openings 132a each overlapping a corresponding bonding pad BP and exposing at least a part of the second conductive portion BPb of the corresponding bonding pad BP. It is to be noted that in this embodiment, the bonding pad BP that are electrically connected to the peripheral lines PL2 may have the second conductive portion BPb and not have the first conductive portion BPa, but the disclosure is not limited thereto.

It is to be noted that in this embodiment, the first conductive portion BPa and the low-reflectivity layer 116 may be formed in the same manufacturing steps as the first mesh pattern MP1, and the second conductive portion BPb may be formed in the same manufacturing steps as the second mesh pattern MP2. That is, the low-reflectivity layer 116 and the low-reflectivity layer 115 of the first mesh line ML1 may optionally be a same low-reflectivity film layer LRL, the first conductive portion BPa of the bonding pad BP and the first metal layer 110 of the first mesh line ML1 may optionally be a same metal film layer M1, and the second conductive portion BPb of the bonding pad BP and the second metal layer 120 of the second mesh line ML2 may optionally be a same metal film layer M2, but the disclosure is not limited thereto. In addition, the peripheral lines PL1 may be formed in the same manufacturing steps as the first mesh pattern MP1 (i.e. formed by the metal film M1), and the peripheral lines PL2 may be formed in the same manufacturing steps as the second mesh pattern MP2 (i.e. formed by the metal film M2), but the disclosure is not limited thereto.

Instead of disposing two low-reflectivity layers respectively on a side of the first metal layer 110 which faces the user USR and a side of the second metal layer 120 which faces the user USR to decrease the light reflection in order to reduce the visibility of the first and second mesh patterns MP1, MP2, the low-reflectivity layer 115 is disposed on a side of the first metal layer 110 which faces the user USR and the width W2 of the second mesh line ML2 is reduced in this embodiment to reduce the visibility of the first and second mesh patterns MP1, MP2. If two low-reflectivity layers are respectively disposed on a side of the first metal layer 110 which faces the user USR and a side of the second metal layer 120 which faces the user USR, a low-reflectivity layer is disposed between the first conductive portion BPa and the second conductive portion BPb of the bonding pad BP. Because the low-reflectivity layer may be a metal oxide layer with a higher resistance than the metal layer, therefore, when a test is performed on the touch-sensing panel having the low-reflectivity layer disposed between the first conductive portion BPa and the second conductive portion BPb and a test probe contacts the second conductive portion BPb of the bonding pad BP via the opening 132a, or when the touch-sensing panel having the low-reflectivity layer disposed between the first conductive portion BPa and the second conductive portion BPb is connected to the circuit board and an anisotropic conductive film (ACF) is disposed between a pin of the circuit board and the second conductive portion BPb of the bonding pad BP exposed via the opening 132a to electrically connect the above two by the anisotropic conductive film, the transmission of a signal between the touch-sensing panel and the test probe or the transmission of a signal between the touch-sensing panel and the circuit board may be poor due to the low-reflectivity layer with a high resistance disposed between the first conductive portion BPa and the second conductive portion BPb. Therefore, by disposing the low-reflectivity layer 115 on a side of the first metal layer 110 which faces the user USR and reducing the width W2 of the second mesh line ML2 in this embodiment to reduce the visibility of the first and second mesh patterns MP1, MP2, a low-reflectivity layer with a high resistance is not disposed between the first conductive portion BPa and the second conductive portion BPb of the bonding pad BP and the signal transmission between the bonding pad BP and the test probe or the circuit board is not affected.

The touch-sensing panel 10 may also optionally include the insulating layer 130 and the light shielding pattern layer 140, which are both disposed in the peripheral area PA of the substrate 100 and are located between the substrate 100 and the low-reflectivity layer 116, but the disclosure is not limited thereto. The light shielding pattern layer 140 is located between the substrate 100 and the insulating layer 130. The touch-sensing panel 10 of this embodiment may be but is not limited to a one glass solution (OGS) touch-sensing panel. The material of the light shielding pattern layer 140 may include metal material (such as chrome), black resin material, or other suitable opaque material. In this embodiment, the materials of the insulating layer 130 may include inorganic materials (silicon oxide, silicon nitride, silicon oxynitride, other suitable materials, or a stacked layer of at least two of the foregoing materials), organic materials, or other suitable materials, or a combination of the foregoing materials.

Other embodiments will be listed in the following to describe the disclosure in detail. The same components will be marked with the same symbols, and the description of the same technical content will be omitted. The omitted parts may be found in the foregoing embodiments, and will not be repeated in the following.

Figure 5:
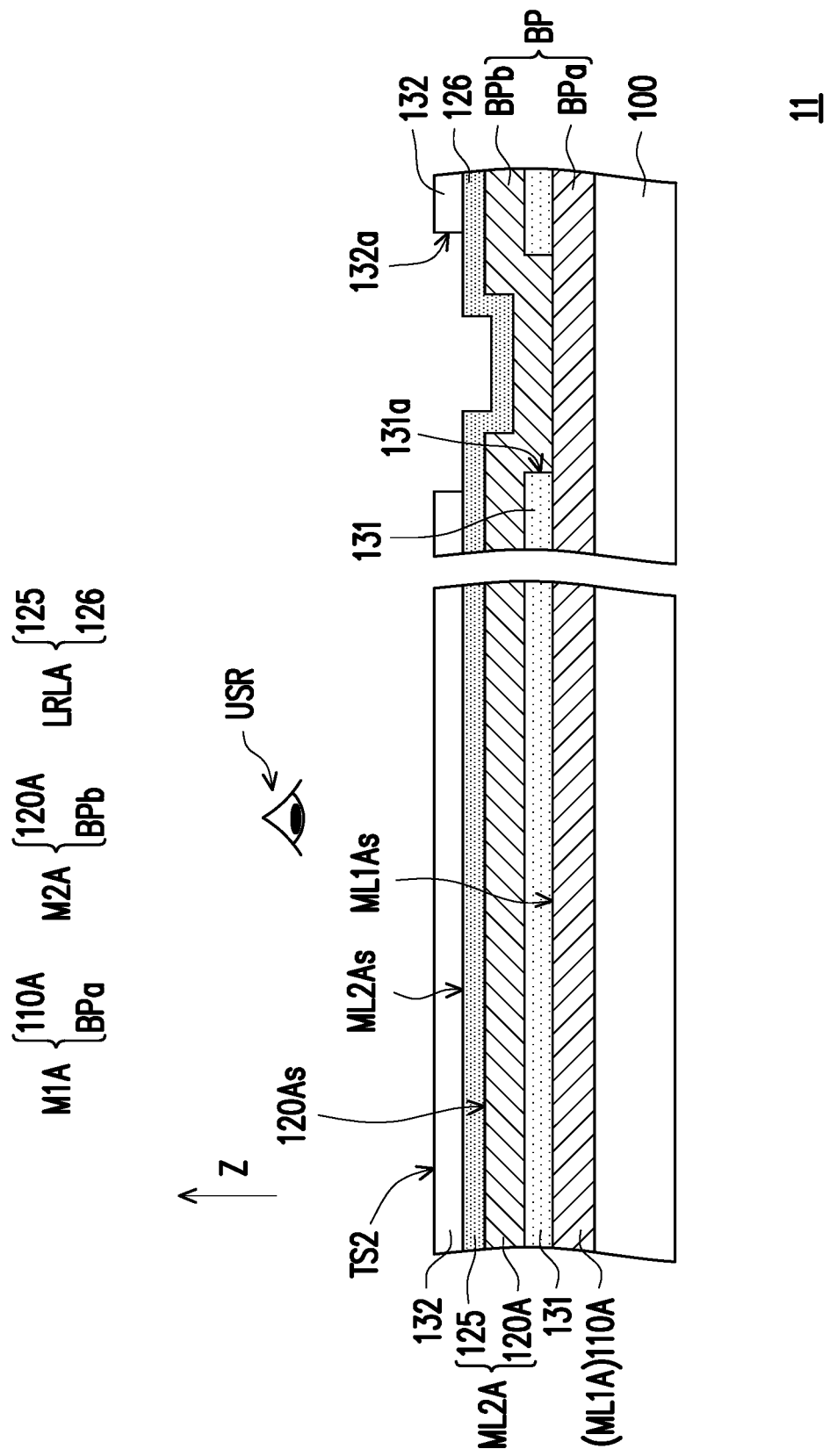
FIG. 5 is a schematic cross-sectional view of a touch-sensing panel according to a second embodiment of the disclosure.
Figure 6:
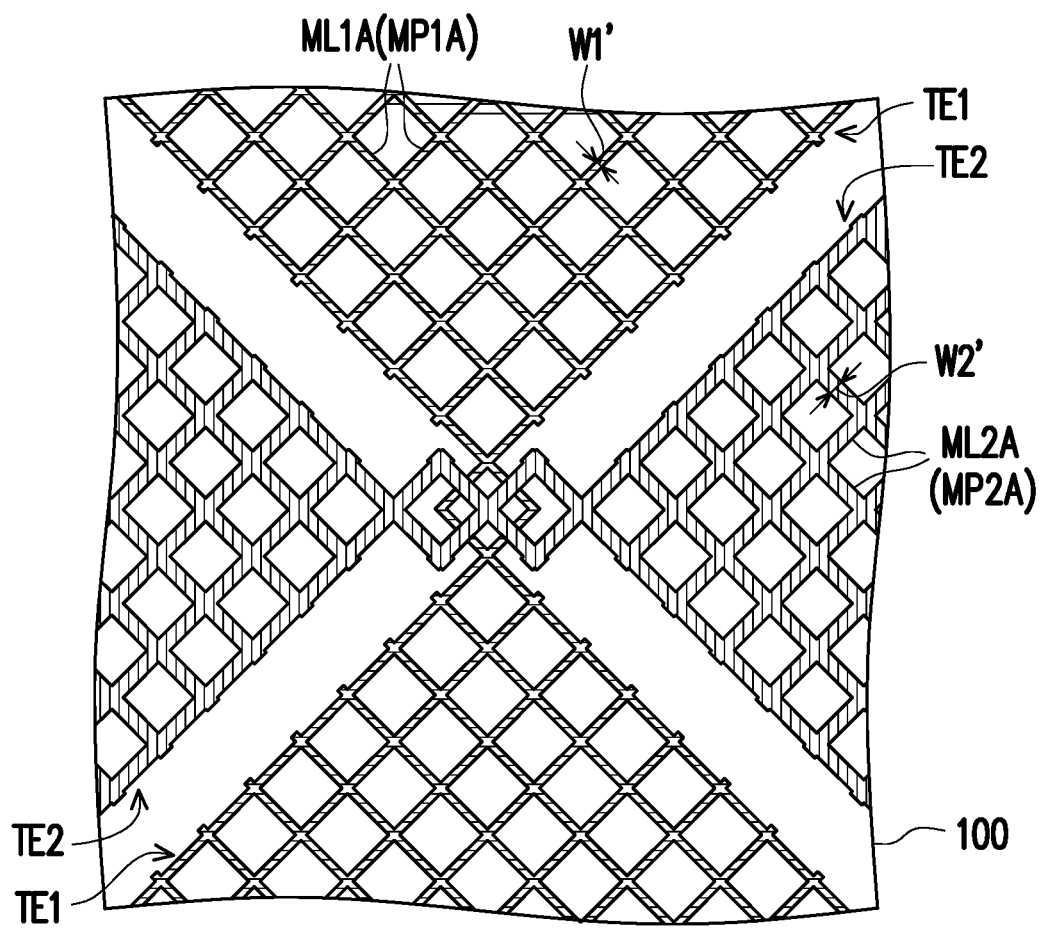
FIG. 6 is an enlarged schematic front view of a partial area of the touch-sensing panel of FIG. 5.
Figure 7:
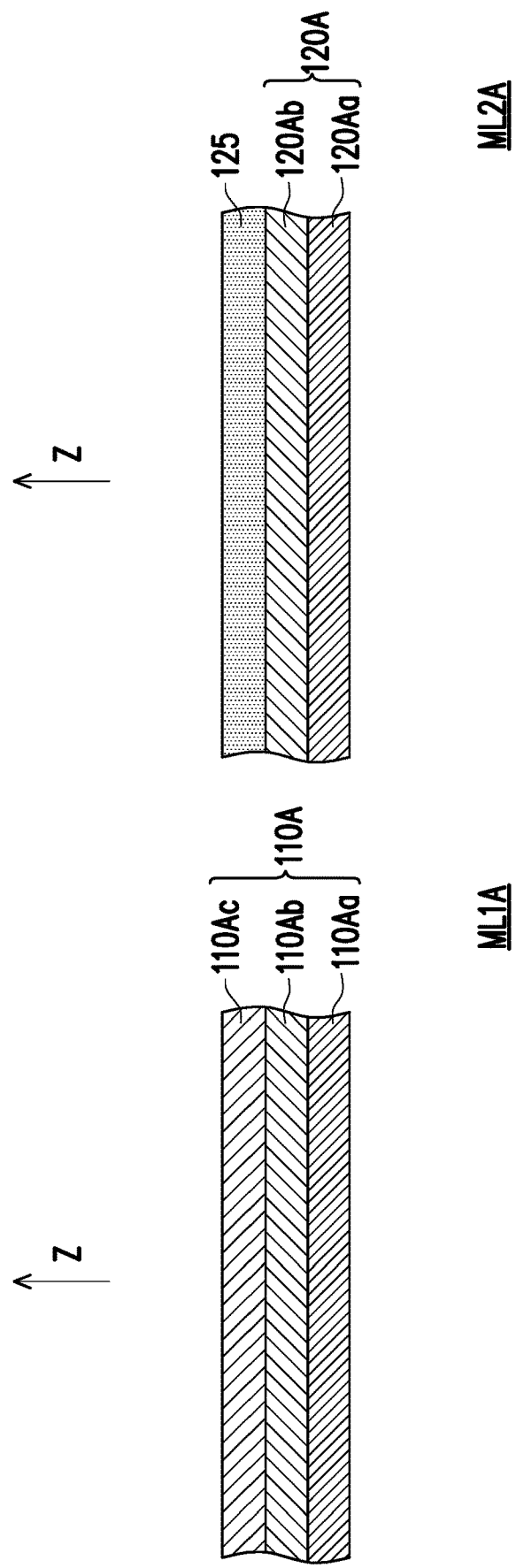
FIGS. 7A and 7B are enlarged schematic views of first mesh lines and second mesh lines of FIG. 5 respectively.

FIG. 5 is a schematic cross-sectional view of a touch-sensing panel according to a second embodiment of the disclosure. FIG. 6 is an enlarged schematic front view of a partial area of the touch-sensing panel of FIG. 5. FIGS. 7A and 7B are enlarged schematic views of first mesh lines and second mesh lines of FIG. 5 respectively. It is to be noted that a front view of the touch-sensing panel of the second embodiment may be found in FIG. 1, and the marks 10, MP1, and MP2 of the touch-sensing panel, the first mesh pattern, and the second mesh pattern in FIG. 1 are changed to 11, MP1A, and MP2A, respectively. In addition, for a clear illustration, FIG. 6 only shows the substrate 100, the first mesh pattern MP1A, and the second mesh pattern MP2A of FIG. 5.

Referring to FIGS. 5 and 6, the main difference between a touch-sensing panel 11 of this embodiment and the touch-sensing panel 10 of FIG. 1 is that the dispositions of the low-reflectivity layer in the two embodiments are different. Specifically, the touch-sensing panel 11 has a touch surface TS2 that a user USR faces when the user USR performs a touch operation on the touch-sensing panel 11, the touch surface TS2 of the touch-sensing panel 11 is located on a side of the substrate 100 where the first and second mesh patterns MP1, MP2 (i.e. the first and second mesh lines ML1, ML2) are disposed. In other words, the user USR is located on the upper side of the substrate 100 in FIG. 5 to perform the touch operations.

In this embodiment, a reflectivity of a surface ML2As of the second mesh line ML2A of the second mesh pattern MP2A that faces away from the substrate 100 and faces the user USR is smaller than a reflectivity of a surface ML1As of the first mesh line ML1A of the first mesh pattern MP1A that faces away from the substrate 100 and faces the user USR. In detail, in this embodiment, the second mesh line ML2A includes a second metal layer 120A and a low-reflectivity layer 125, the second metal layer 120A is located between the low-reflectivity layer 125 and the substrate 100, and a reflectivity of the low-reflectivity layer 125 is smaller than a reflectivity of the second metal layer 120A. Specifically, the reflectivity of the low-reflectivity layer 125 is smaller than a reflectivity of a surface 120As of the second metal layer 120A that faces away from the substrate 100 and faces the user USR. In this embodiment, the low-reflectivity layer 125 with the reflectivity smaller than the reflectivity of the second metal layer 120A is disposed on the surface 120As of the second metal layer 120A that faces away from the substrate 100 and faces the user USR, so as to prevent the user USR from seeing the second mesh pattern MP2A due to light reflection. Therefore, a concealment of the second mesh pattern MP2A may be facilitated. A "low reflectivity" of the low-reflectivity layer 125 means that, as compared to the second metal layer 120A, the reflectivity of the low-reflectivity layer 125 is smaller than the reflectivity of the second metal layer 120A. The first mesh line ML1A include a first metal layer 110A. The reflectivity of the low-reflectivity layer 125 is smaller than a reflectivity of the first metal layer 110A. Specifically, the reflectivity of the low-reflectivity layer 125 is smaller than the reflectivity of a surface of the first metal layer 110A that faces away from the substrate 100 and faces the user USR. As shown in FIG. 5, the surface ML2As of the second mesh line ML2A is the surface of the low-reflectivity layer 125 that faces away from the substrate 100 and faces the user USR, and the surface ML1As of the first mesh line ML1A is the surface of the first metal layer 110A that faces away from the substrate 100 and faces the user USR. The surface ML1As of the first mesh line ML1A and the surface ML2As of the second mesh line ML2A may be referred to as the surface ML1As of the first mesh pattern MP1A and the surface ML2As of the second mesh pattern MP2A, respectively. Further descriptions of the reflectivity of the surface ML2As of the second mesh line ML2A of the second mesh pattern MP2A that face away from the substrate 100 being smaller than the reflectivity of the surface ML1As of the first mesh line ML1A of the first mesh pattern MP1A that face away from of the substrate 100 may be found in the description of the bonding pads BP of the peripheral lines PL1 in FIG. 5 in the following.

In this embodiment, a color of the surface (that is, the surface ML2As) of the low-reflectivity layer 125 of the second mesh line ML2A may be dark, such as black, but is not limited to this. For example, the low-reflectivity layer 125 may be a metal oxide layer, and the metal material of the metal oxide layer may be selected from molybdenum, copper, aluminum, silver, tantalum, or a combination thereof, but is not limited thereto. Since the color of the surface ML2As of the second mesh line ML2A that faces the user USR is dark (such as black), the visibility of the second mesh lines ML2A may be reduced.

On the other hand, the first metal layer 110A of the first mesh line ML1A may be a stacked structure of a metal material layer 110Aa, a metal material layer 110Ab, and a metal material layer 110Ac (as shown in FIG. 7A). For example, the metal material layer 110Aa, the metal material layer 110Ab, and the metal material layer 110Ac may be a molybdenum layer, an aluminum layer, and a molybdenum layer respectively, but are not limited thereto. The second metal layer 120A of the second mesh lines ML2A may be a stacked structure of a metal material layer 120Aa and a metal material layer 120Ab (as shown in FIG. 7B). For example, the metal material layer 120Aa and the metal material layer 120Ab may be a molybdenum layer and an aluminum layer respectively, but are not limited thereto. As described above, the reflectivity of the low-reflectivity layer 125 is smaller than the reflectivity of the surface (that is, the surface ML1As of the first mesh lines ML1A) of the first metal layer 110A that faces away from the substrate 100 and faces the user USR and the reflectivity of the surface 120As of the second metal layer 120A facing away from the substrate 100 and facing the user USR. Specifically, since the metal material layer 110Ac is the metal material layer in the first metal layer 110A that faces the user USR, and the metal material layer 120Ab is the metal material layer in the second metal layer 120A that faces the user USR, the reflectivity of the low-reflectivity layer 125 is smaller than a reflectivity of the metal material layer 110Ac in the first metal layer 110A and a reflectivity of the metal material layer 120Ab in the second metal layer 120A. In other embodiments, one and the other of the first metal layer 110A and the second metal layer 120A may be a multi-layer stacked structure having multiple metal material layers and a single-layer structure having a metal material layer respectively, or each of the first metal layer 110A and the second metal layer 120A may be a single-layer structure. In summary, when each of the first metal layer 110A and the second metal layer 120A is the multi-layer stacked structure having multiple metal material layers, the reflectivity of the low-reflectivity layer 125 is smaller than the reflectivity of the metal material layer in the first metal layer 110A that faces the user USR and the reflectivity of the metal material layer in the second metal layer 120A that faces the user USR. When each of the first metal layer 110A and the second metal layer 120A is the single-layer structure having the single metal material layer, the reflectivity of the reflective layer 125 is smaller than the reflectivity of the first metal layer 110A and the reflectivity of the second metal layer 120A. When the first metal layer 110A and the second metal layer 120A are the multi-layer stacked structure having the multiple metal material layers and the single-layer structure having the single metal material layer respectively, or when the first metal layer 110A and the second metal layer 120A are the single-layer structure having the single metal material layer and the multi-layer stacked structure having the multiple metal material layers respectively, the reflectivity of the low-reflectivity layer 125 is smaller than the reflectivity of the metal material layer in the first metal layer 110A that faces the user USR and the reflectivity of the second metal layer 120A, or smaller than the reflectivity of the first metal layer 110A and the reflectivity of the metal material layer in the second metal layer 120A that faces the user USR.

It is to be noted that in this embodiment, an example is given in which a number of the metal material layers of the first metal layer 110A and a number of the metal material layers of the second metal layer 120A are three and two respectively for illustrative description. The example does not mean that the disclosure is limited by the content disclosed in the drawings. In other embodiments, the number of the metal material layers of the first metal layer 110 and the number of the metal material layers of the second metal layer 120 may be adjusted according to actual electrical property or manufacturing process needs.

Since the reflectivity of the surface ML1As of the first mesh line ML1A that faces the user USR is greater than the reflectivity of the surface ML2As of the second mesh line ML2A that faces the user USR, in this embodiment, a width W1' of the first mesh line ML1A may be optionally smaller than a width W2' of the second mesh line ML2A, so that the visibility of the first mesh lines ML1A may be reduced. Therefore, a concealment of the first mesh pattern MP1A may be facilitated. In other words, by disposing the low-reflectivity layer 125 on the second mesh line ML2A that are closer to the user USR and reducing a line width of the first mesh line ML1A that are farther from the user USR, the concealment of the first mesh pattern MP1A and the second mesh pattern MP2A may be facilitated.

The bonding pad BP that is electrically connected to the peripheral line PL1 includes the first conductive portion BPa and the second conductive portion BPb that are electrically connected to each other. The first conductive portion BPa is located between the second conductive portion BPb and the substrate 100. The insulating layer 131 has multiple contact holes 131a each overlapping the first conductive portion BPa of a corresponding bonding pad BP. The second conductive portion BPb contacts the first conductive portion BPa via this contact hole 131a. The low-reflectivity layer 126 is located between the second conductive portion BPb and the insulating layer 132. The insulating layer 132 has multiple openings 132a each overlapping and exposing at least a part of the low-reflectivity layer 126 of a corresponding bonding pad BP. It is to be noted that in this embodiment, the bonding pads BP that are electrically connected to the peripheral lines PL2 may have the second conductive portion BPb and not have the first conductive portion BPa, but the disclosure is not limited thereto.

It is to be noted that in this embodiment, the first conductive portion BPa may be formed in the same manufacturing steps as the first mesh pattern MP1A, and the second conductive portion BPb and the low-reflectivity layer 126 may be formed in the same manufacturing steps as the second mesh pattern MP2A. That is, the first conductive portion BPa of the bonding pad BP and the first metal layer 110A of the first mesh line ML1A may optionally be a same metal film layer M1A, the second conductive portion BPb of the bonding pad BP and the second metal layer 120A of the second mesh line ML2A may optionally be a same metal film layer M2A, and the low-reflectivity layer 126 and the low-reflectivity layer 125 of the second mesh line ML2A may optionally be a same low-reflectivity film layer LRLA, but the disclosure is not limited thereto.

Instead of disposing two low-reflectivity layers respectively on a side of the first metal layer 110A which faces the user USR and a side of the second metal layer 120A which faces the user USR to decrease the light reflection in order to reduce the visibility of the first and second mesh patterns MP1A, MP2A, the low-reflectivity layer 125 is disposed on a side of the second metal layer 120A which faces the user USR and the width W1' of the first mesh line ML1A is reduced in this embodiment to reduce the visibility of the first and second mesh patterns MP1A, MP2A. If two low-reflectivity layers are respectively disposed on a side of the first metal layer 110A which faces the user USR and a side of the second metal layer 120A which faces the user USR, a low-reflectivity layer is disposed between the first conductive portion BPa and the second conductive portion BPb of the bonding pad BP. Because the low-reflectivity layer may be a metal oxide layer with a higher resistance than the metal layer, therefore, when a test is performed on the touch-sensing panel having the low-reflectivity layer disposed between the first conductive portion BPa and the second conductive portion BPb and a test probe contacts the second conductive portion BPb of the bonding pad BP via the opening 132a, or when the touch-sensing panel having the low-reflectivity layer disposed between the first conductive portion BPa and the second conductive portion BPb is connected to the circuit board and an anisotropic conductive film (ACF) is disposed between a pin of the circuit board and the second conductive portion BPb of the bonding pad BP exposed via the opening 132a to electrically connect the above two by the anisotropic conductive film, the transmission of a signal between the touch-sensing panel and the test probe or the transmission of a signal between the touch-sensing panel and the circuit board may be poor due to the low-reflectivity layer with a high resistance disposed between the first conductive portion BPa and the second conductive portion BPb. Therefore, by disposing the low-reflectivity layer 115 on a side of the second metal layer 120A which faces the user USR and reducing the width W1' of the first mesh line ML1A in this embodiment to reduce the visibility of the first and second mesh patterns MP1A, MP2A, a low-reflectivity layer with a high resistance is not disposed between the first conductive portion BPa and the second conductive portion BPb of the bonding pad BP and the signal transmission between the bonding pad BP and the test probe or the circuit board is not affected. It is to be noted that, as shown in FIG. 5, the low-reflectivity layer 126 is disposed on the second conductive portion BPb of the bonding pad BP and is exposed by the opening 132 of the insulating layer 132, but a hardness of the low-reflectivity layer 126 is not high. Therefore, when the test is performed on the touch-sensing panel 11 and the test probe contacts the low-reflectivity layer 126 via the opening 132a, or when the touch-sensing panel 11 is connected to the circuit board and the anisotropic conductive film (ACF) is disposed between a pin of the circuit board and the low-reflectivity layer 126 via the opening 132a, the test probe may penetrate the low-reflectivity layer 126 and directly contact the second conductive portion BPb of the bonding pads BP or conductive particles (not shown) of the anisotropic conductive film (ACF) may crush the low-reflectivity layer 126 and directly contact the second conductive portion BPb of the bonding pads BP. Therefore, the signal transmission between the bonding pad BP and the test probe or the circuit board is not affected.

Figure 8:
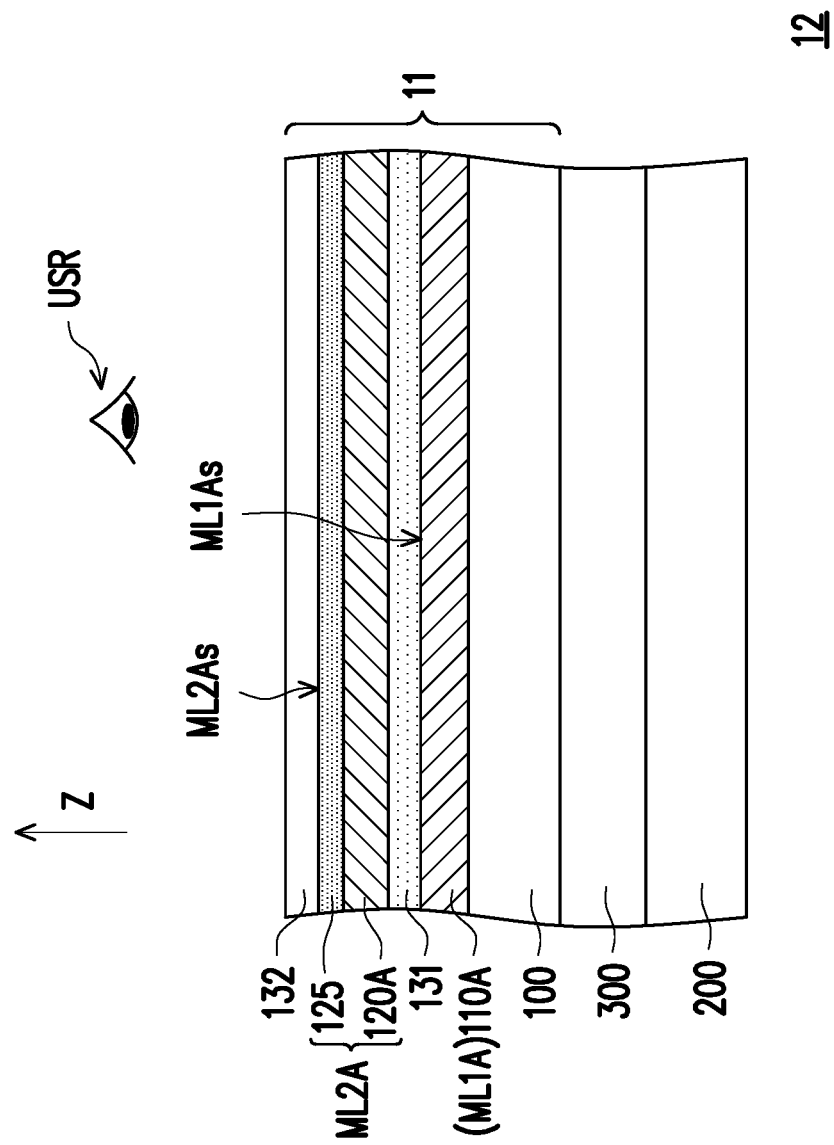
FIG. 8 is a schematic cross-sectional view of a touch display panel with the touch-sensing panel of the second embodiment of the disclosure.

For example, in this embodiment, the substrate 100 of the touch-sensing panel 11 may be the upper substrate of the display panel. As shown in FIG. 8, the display panel may further include a lower substrate 200 and a display medium layer 300, and the display medium layer 300 is disposed between the substrate 100 and the lower substrate 200 of the display panel. The display medium layer 300 includes, for example, multiple liquid crystal molecules (not shown). The lower substrate 200 may be a rigid substrate or a flexible substrate. The material of the lower substrate 200 includes glass, quartz, polyimide (PI), polyethylene terephthalate (PET), polymer substrate, or other suitable plates. In addition, the display panel may further include multiple thin film transistors, multiple pixel electrodes and common electrodes (not shown). The thin film transistors and the pixel electrodes are disposed between the lower substrate 200 and the display medium layer 300. The common electrodes are disposed between the lower substrate 200 and the display medium layer 300 or between the display medium layer 300 and the substrate 100. In some embodiments, at least one color filter layer may be further disposed between the display medium layer 300 and the substrate 100, or at least one color filter layer may be further disposed between the lower substrate 200 and the display medium layer 300. For example, after the display panel that includes the lower substrate 200, the display medium layer 300 and the substrate 100 is formed, the first mesh pattern MP1, the second mesh pattern MP2, and the insulating layers 131 and 132 may be formed on a surface of the substrate 100 that faces away from the display medium layer 300 to form a touch display panel 12; or after the touch-sensing panel 11 is formed, the surface of the substrate 100 of the touch-sensing panel 11 that faces away from the first mesh pattern MP1, the second mesh pattern MP2, and the insulating layers 131 and 132 may be directed to face the lower substrate 200, and the display medium layer 300 may be disposed between the substrate 100 and the lower substrate 200 to form the touch display panel 12. The touch-sensing panel 11 of this embodiment may be an on-cell touch-sensing panel.

Figure 9:
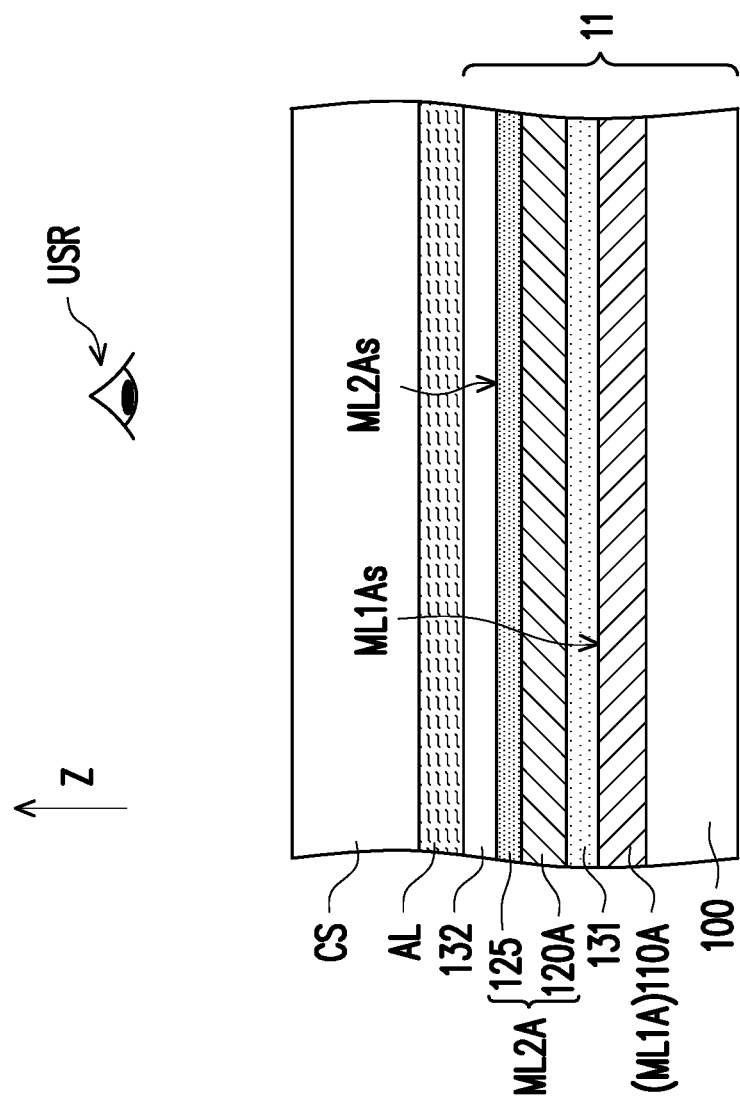
FIG. 9 is a schematic cross-sectional view of the touch-sensing panel attached to another substrate according to the second embodiment of the disclosure.

In addition, in some embodiments, the touch-sensing panel 11 may be used to be attached to other substrates. For example, referring to FIG. 9, the touch-sensing panel 11 of this embodiment is attached to a substrate CS via an adhering layer AL. For example, in this embodiment, the substrate CS is, for example, a cover lens, and is attached to the insulating layer 132 via the adhering layer AL, but the disclosure is not limited thereto. In other words, the insulating layer 132 is located between the second mesh pattern (that is, the second mesh lines ML2A) and the adhering layer AL, and the adhering layer AL is located between the insulating layer 132 and the substrate CS.

Figure 10:
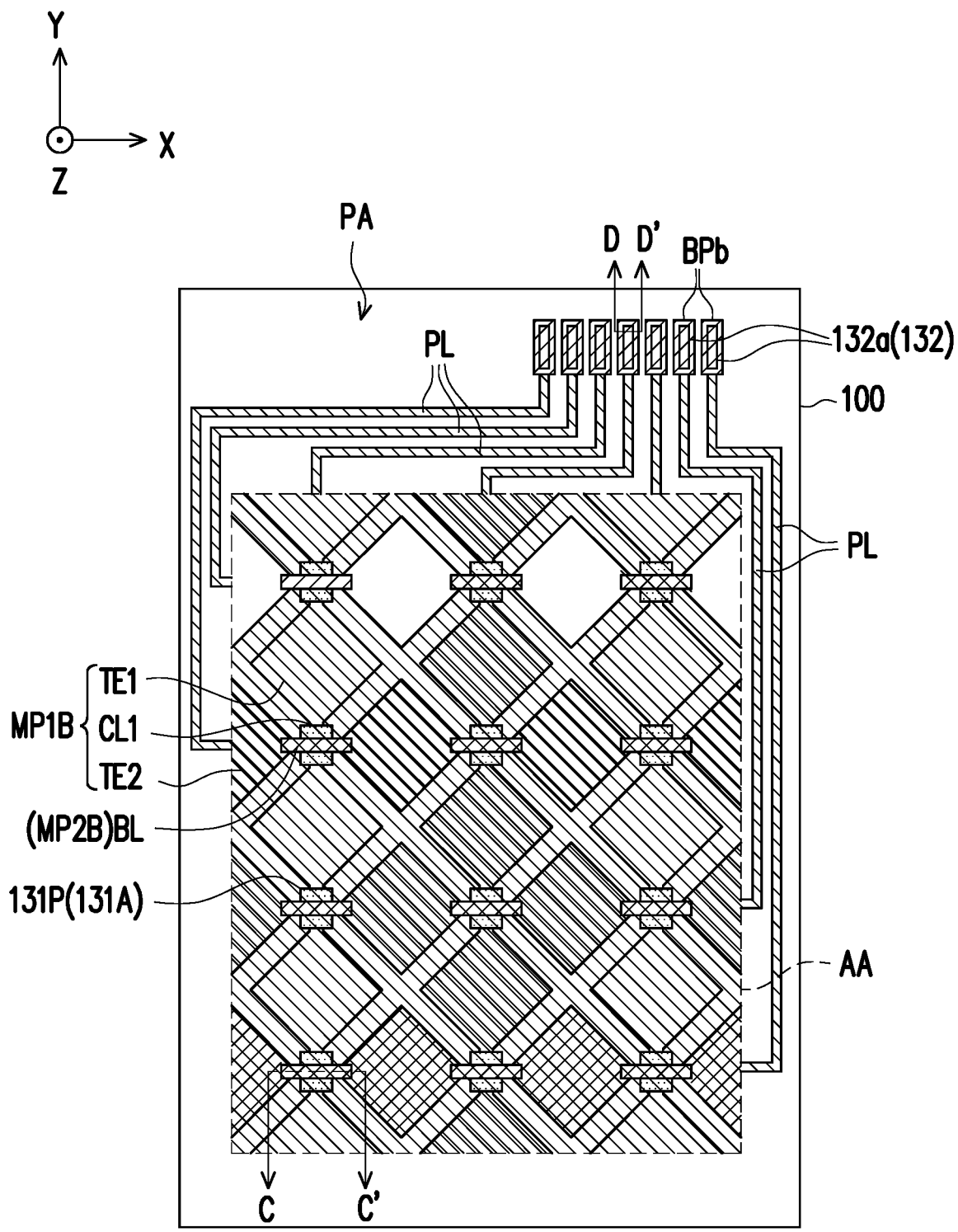
FIG. 10 is a schematic front view of a touch-sensing panel according to a third embodiment of the disclosure.
Figure 11:
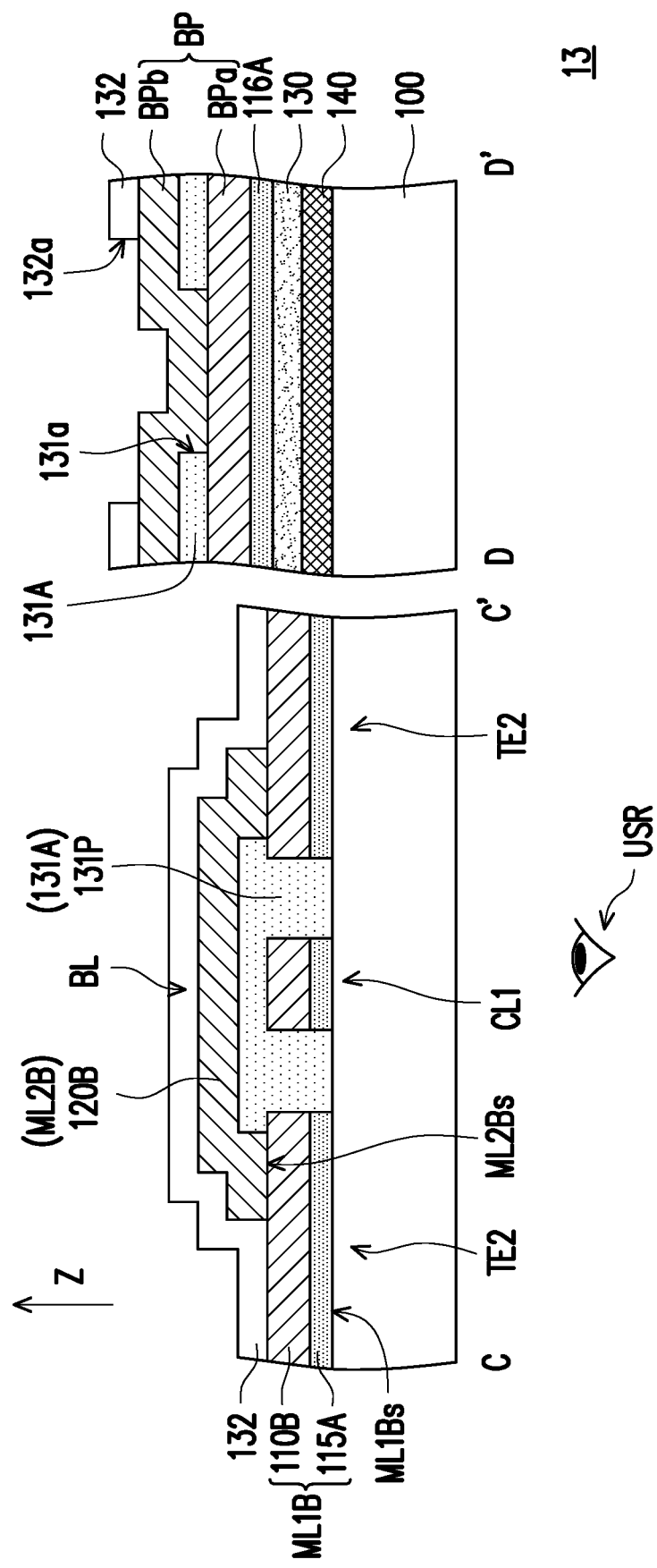
FIG. 11 is a schematic cross-sectional view of the touch-sensing panel of FIG. 10.

FIG. 10 is a schematic front view of a touch-sensing panel according to a third embodiment of the disclosure. FIG. 11 is a schematic cross-sectional view of the touch-sensing panel of FIG. 10. It is to be noted that FIG. 11 corresponds to a sectional line C-C' and a sectional line D-D' of FIG. 10. For a clear illustration, FIG. 10 omits the light shielding pattern layer 140 and the insulating layer 130 of FIG. 11. Referring to FIGS. 10 and 11, the difference between a touch-sensing panel 13 of this embodiment and the touch-sensing panel 10 of FIG. 3 is that the dispositions of the touch electrodes in the two embodiments are different. Specifically, a first mesh pattern MP1B of the touch-sensing panel 13 includes multiple first touch electrodes TE1, multiple connecting lines CL1, and multiple second touch electrodes TE2, two of the first touch electrodes TE1 that are adjacent to each other are electrically connected to each other via a corresponding connecting line CL1, and the second touch electrodes TE2 are electrically insulated from the first touch electrodes TE1 and the connecting lines CL1.

On the other hand, a second mesh pattern MP2B includes multiple bridging lines BL, and two of the second touch electrodes TE2 that are adjacent to each other are electrically connected to each other via a corresponding bridging line BL, but the disclosure is not limited thereto. In other embodiments, any two of the second touch electrodes TE2 that are adjacent to each other may also be electrically connected to each other via two or more bridging lines BL. In this embodiment, the insulating layer 131A may have multiple insulating patterns 131P. For example, from a perspective of the direction Z, the insulating patterns 131P may be a block structure, but the disclosure is not limited thereto. Each of the insulating patterns 131P overlaps a corresponding one of the connecting lines CL1 of the first mesh pattern MP1B in a direction perpendicular to the substrate 100 (such as the direction Z), and each of the bridging lines BLs of the second mesh pattern MP2B covers a corresponding one of the insulating patterns 131P to electrically connect two of the second touch electrodes TE2 on opposite sides of the corresponding insulating pattern 131P.

In this embodiment, the first touch electrodes TE1, the second touch electrodes TE2, and the connecting lines CL1 are formed by the first mesh lines ML1B, and the bridging lines BL are formed by the second mesh lines ML2B. Since the structures and materials of the low-reflectivity layer 115A and the first metal layer 110B of the first mesh line ML1B and the second metal layer 120B of the second mesh line ML2B of this embodiment are similar to the structures and materials of the low-reflectivity layer 115 and the first metal layer 110 of the first mesh line ML1 and the second metal layer 120 of the second mesh line ML2 of the touch-sensing panel 10 of the first embodiment respectively, a detailed description of the structures and materials of the low-reflectivity layer 115A and the first metal layer 110B of the first mesh line ML1B and the second metal layer 120B of the second mesh line ML2B of this embodiment may be found in the relevant paragraphs of the foregoing embodiment and will not be repeated here.

In this embodiment, a reflectivity of the surface ML2Bs of the second mesh line ML2B that faces the user USR is greater than a reflectivity of the surface ML1Bs of the first mesh line ML1B that faces the user USR. Therefore, a width (not shown) of the second mesh line ML2B of this embodiment may optionally be smaller than a width (not shown) of the first mesh line ML1B, so that the visibility of the second mesh lines ML2B is reduced. In other words, by disposing the low-reflectivity layer 115A on a side, which faces the user USR, of the first mesh line ML1B that are closer to the user USR and reducing the width of the second mesh line ML2B that are farther from the user USR, the concealment of the first mesh pattern MP1B and the second mesh pattern MP2B may be facilitated.

Similar to the first embodiment, in this embodiment, the low-reflectivity layer 116A disposed below the bonding pad BP and the low-reflectivity layer 115A of the first mesh line ML1B may optionally be a same low-reflectivity film layer, the first conductive portion BPa of the bonding pad BP and the first metal layer 110B of the first mesh line ML1B may optionally be a same metal film layer, and the second conductive portion BPb of the bonding pad BP and the second metal layer 120B of the second mesh line ML2B may optionally be a same metal film layer, but the disclosure is not limited thereto. By disposing the low-reflectivity layer 115A on a side of the first mesh line ML1B which faces the user USR and reducing the width of the second mesh line ML2B in this embodiment to reduce the visibility of the first and second mesh line ML1, ML2, there is no low-reflectivity layer with a high resistance disposed between the first conductive portion BPa and the second conductive portion BPb of the bonding pad BP, therefore, the touch-sensing panel 13 may be prevented from signal transmission problem between the bonding pad BP and a test probe or a circuit board when performing a test on the touch-sensing panel 13 or when the touch-sensing panel 13 is connected to the circuit board.

Figure 12:
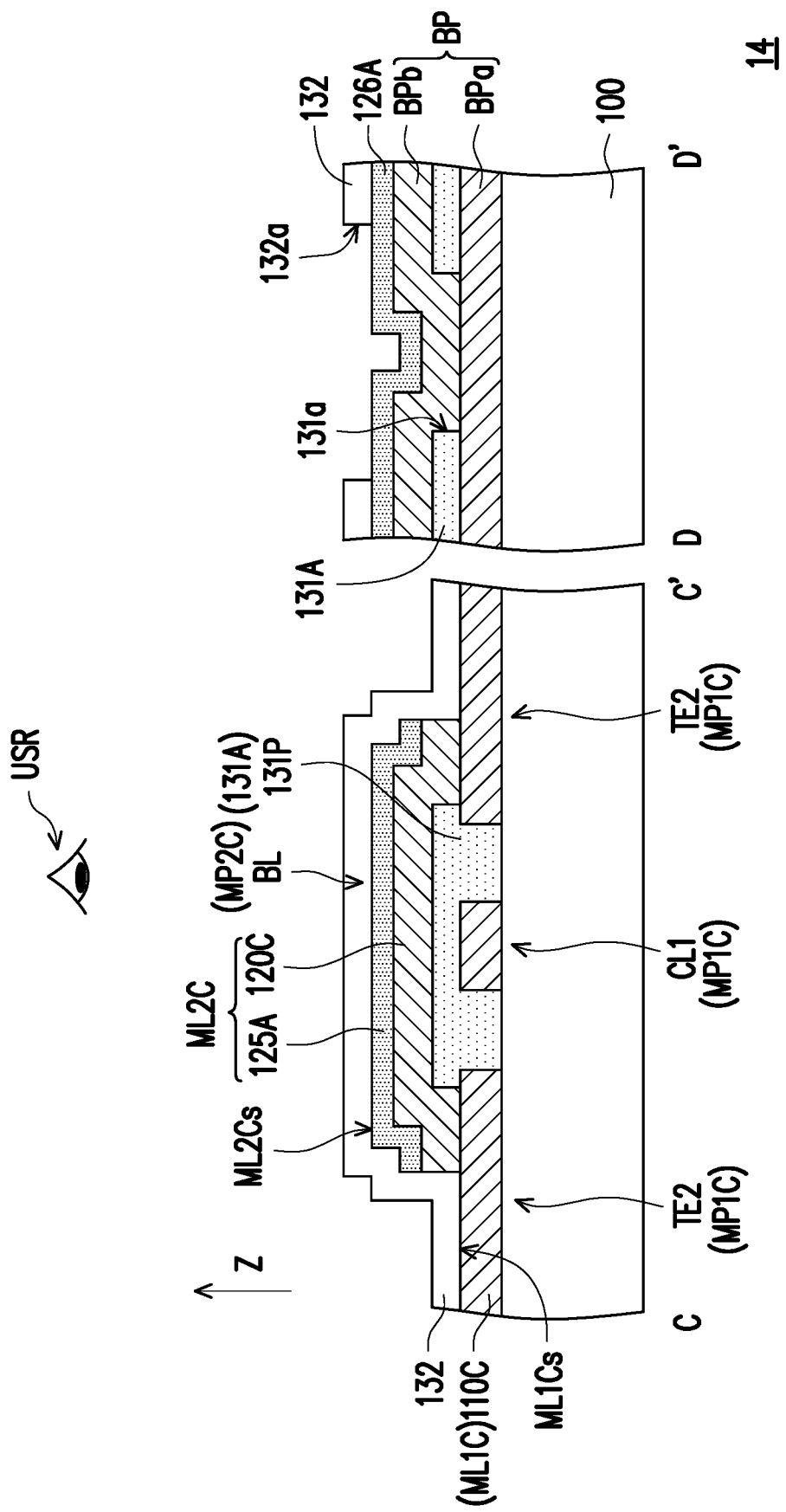
FIG. 12 is a schematic cross-sectional view of a touch-sensing panel according to a fourth embodiment of the disclosure.

FIG. 12 is a schematic cross-sectional view of a touch-sensing panel according to a fourth embodiment of the disclosure. It is to be noted that a front view of the touch-sensing panel of the fourth embodiment may be found in FIG. 10, and the marks 13, MP1B, and MP2B of the touch-sensing panel, the first mesh pattern, and the second mesh pattern in FIG. 10 are changed to 14, MP1C, and MP2C, respectively.

The main difference between a touch-sensing panel 14 of this embodiment and the touch-sensing panel 13 of the third embodiment is that the dispositions of the low-reflectivity layer in the two embodiments are different. Specifically, a touch surface of the touch-sensing panel 14 is located on a side of the substrate 100 where the first and second mesh patterns MP1C, MP2C are disposed. In other words, the user USR is located on the upper side of the substrate 100 in FIG. 12 to perform touch operations.

Similar to the third embodiment, a first mesh pattern MP1C of the touch-sensing panel 14 includes multiple first touch electrodes TE1, multiple connecting lines CL1, and multiple second touch electrodes TE2, two of the first touch electrodes TE1 that are adjacent to each other are electrically connected to each other via a corresponding connecting line CL1, and the second touch electrodes TE2 are electrically insulated from the first touch electrodes TE1 and the connecting lines CL1. On the other hand, a second mesh pattern MP2C includes multiple bridging lines BL, and two of the second touch electrodes TE2 that are adjacent to each other are electrically connected to each other via a corresponding bridging line BL. In this embodiment, an insulating layer 131A may have multiple insulating patterns 131P. The insulating patterns 131P overlap the connecting lines CL1 of the first mesh pattern MP1C respectively in a direction perpendicular to the substrate 100 (such as the direction Z), and each of the bridging line BLs of the second mesh pattern MP2C covers a corresponding one of the insulating patterns 131P to electrically connect two of the second touch electrodes TE2 on opposite sides of the corresponding insulating pattern 131P.

The first touch electrodes TE1, the second touch electrodes TE2, and the connecting lines CL1 of this embodiment are formed by multiple first mesh lines ML1C, and the bridging lines BL is formed by multiple second mesh lines ML2C. Since the structures and materials of the first metal layer 110C of the first mesh line ML1C and the low-reflectivity layer 125A and the second metal layer 120C of the second mesh line ML2B of this embodiment are similar to the structures and materials of the first metal layer 110A of the first mesh line ML1A and the low-reflectivity layer 125 and the second metal layer 120A of the second mesh line ML2A of the touch-sensing panel 11 of the second embodiment, a detailed description of the structures and materials of the first metal layer 110C of the first mesh line ML1C and the low-reflectivity layer 125A and the second metal layer 120C of the second mesh line ML2B of this embodiment may be found in the relevant paragraphs of the foregoing embodiment and will not be repeated here.

In this embodiment, since a reflectivity of a surface ML1Cs of the first mesh line ML1C that faces the user USR is greater than a reflectivity of a surface ML2Cs of the second mesh line ML2C that faces the user USR, a width (not shown) of the first mesh line ML1C of this embodiment may optionally be smaller than a width (not shown) of the second mesh line ML2C, so that the visibility of the first mesh lines ML1C is reduced. In other words, by disposing the low-reflectivity layer 125A on a side, which faces the user USR, of the second mesh line ML2C that are closer to the user USR and reducing a width of the first mesh line ML1C that are farther from the user USR, the concealment of the first mesh pattern MP1C and the second mesh pattern MP2C may be facilitated.

On the other hand, in this embodiment, the first conductive portion BPa of the bonding pad BP and a first metal layer 110C of the first mesh line ML1C may optionally be a same metal film layer, the second conductive portion BPb of the bonding pad BP and a second metal layer 120C of the second mesh line ML2C may optionally be a same metal film layer, and a low-reflectivity layer 126A and the low-reflectivity layer 125A of the second mesh line ML2C may optionally be a same low-reflectivity film layer, but the disclosure is not limited thereto.

Figure 13:
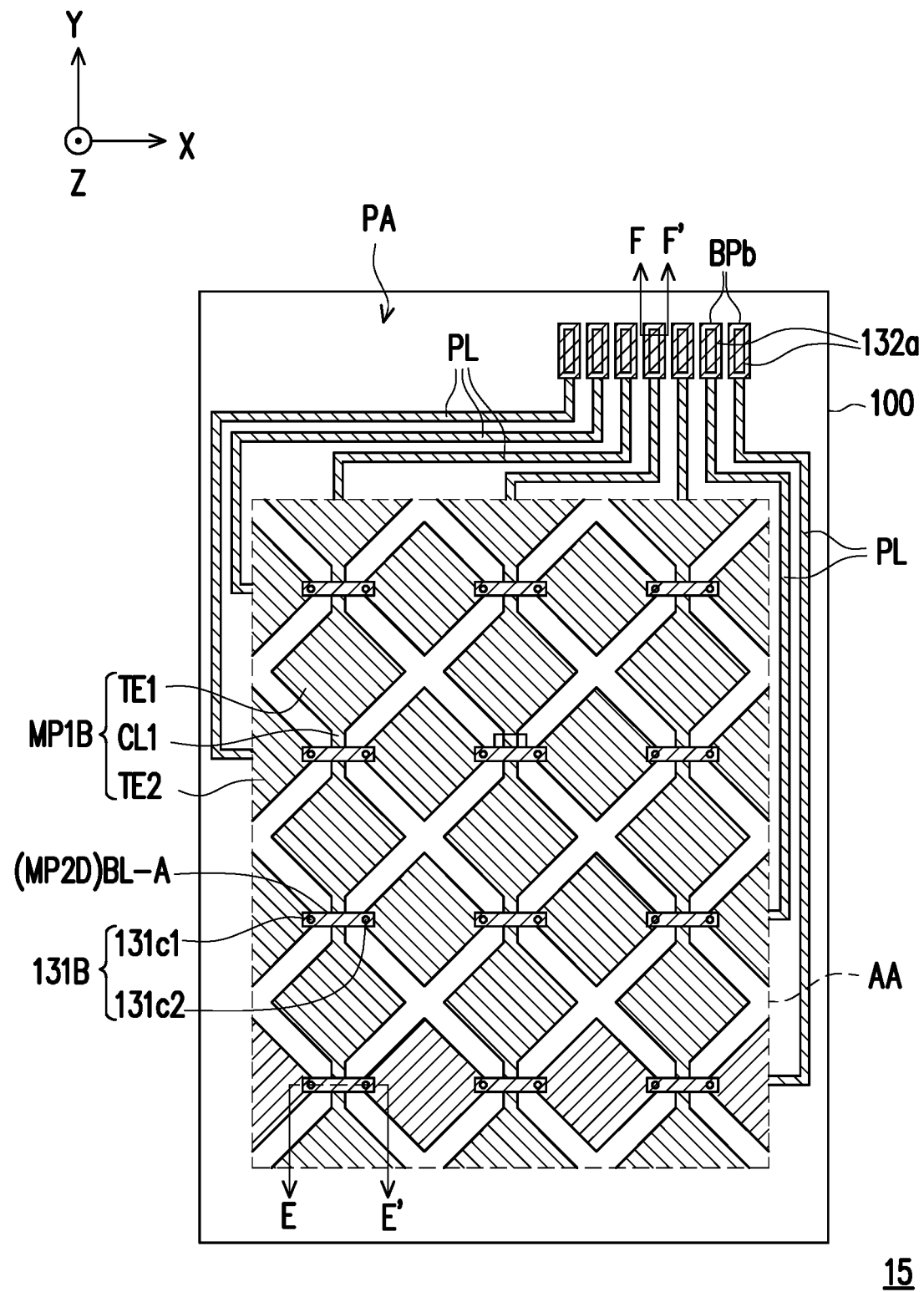
FIG. 13 is a schematic front view of a touch-sensing panel according to a fifth embodiment of the disclosure.
Figure 14:
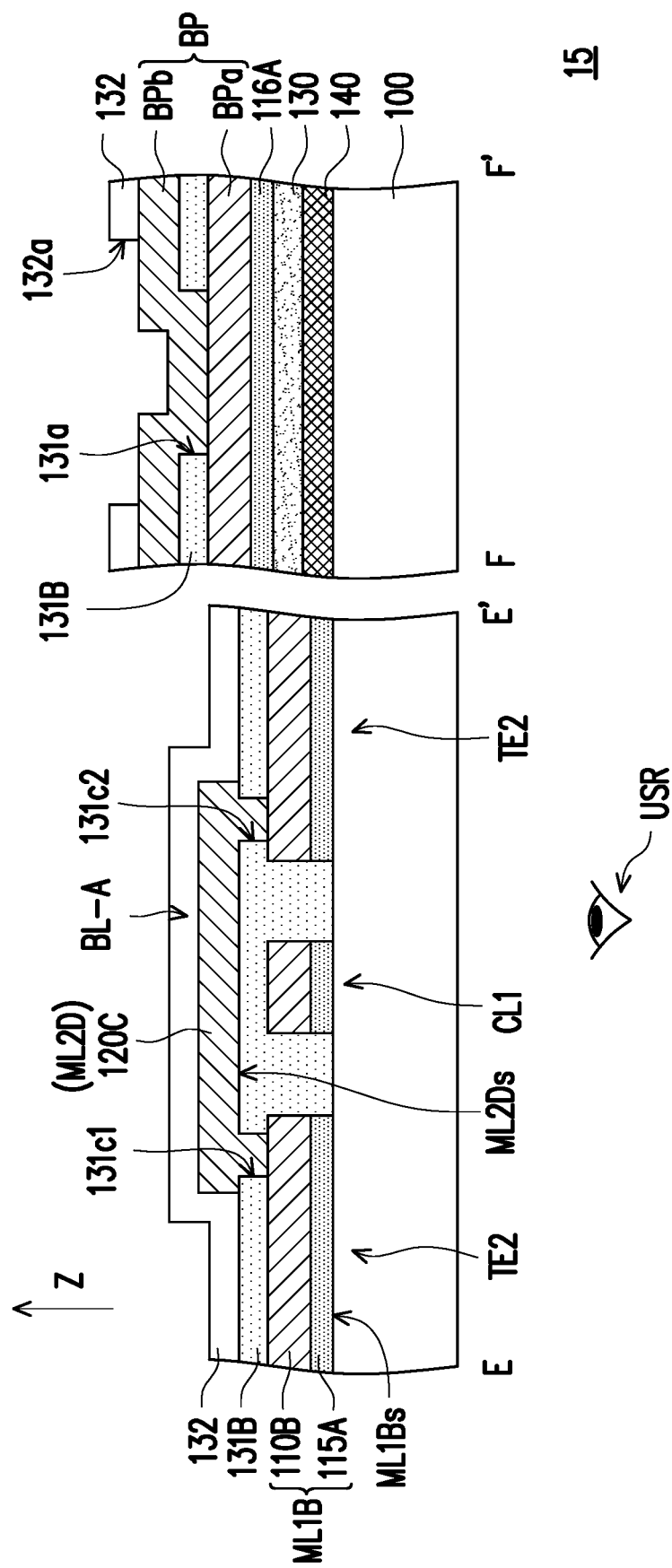
FIG. 14 is a schematic cross-sectional view of the touch-sensing panel of FIG. 13.

FIG. 13 is a schematic front view of a touch-sensing panel according to a fifth embodiment of the disclosure. FIG. 14 is a schematic cross-sectional view of the touch-sensing panel of FIG. 13. It is to be noted that FIG. 14 corresponds to a sectional line E-E' and a sectional line F-F' of FIG. 13. For a clear illustration, FIG. 13 omits the light shielding pattern layer 140 and the insulating layer 130 in FIG. 14. Referring to FIGS. 13 and 14, the main difference between a touch-sensing panel 15 of this embodiment and the touch-sensing panel 13 of the third embodiment (as shown in FIGS. 10 and 11) is that the bridging lines and the second touch electrodes in the two embodiments are connected in different ways. Specifically, unlike the insulating layer 131A in FIG. 10 which has the multiple insulating patterns 131P that are separated from each other in the active area AA, an insulating layer 131B of the touch-sensing panel 15 of this embodiment has multiple contact holes 131c1 and multiple contact holes 131c2, and each of the contact holes 131c1, 131c2 overlaps and exposes a portion of a corresponding one of the second touch electrodes TE2. Each of multiple bridging lines BL-A overlaps a corresponding one of multiple connecting lines CL1 of the first mesh pattern MP1B, and each of the bridging lines BL-A electrically connects to adjacent two of the second touch electrodes TE2 via the contact hole 131c1 and the contact hole 131c2 of the insulating layer 131B.

The first touch electrodes TE1, the second touch electrodes TE2, and the connecting lines CL1 of this embodiment are formed by multiple first mesh lines ML1B, and the bridging lines BL-A is formed by multiple second mesh lines ML2D. Since the structures and materials of the low-reflectivity layer 115A, the first metal layer 110B of the first mesh line ML1B and the second metal layer 120C of the second mesh line ML2D of this embodiment are similar to the structures and materials of the low-reflectivity layer 115, the first metal layer 110 of the first mesh line ML1 and the second metal layer 120 of the second mesh line ML2 of the touch-sensing panel 10 of the first embodiment, a detailed description of the structures and materials of the low-reflectivity layer 115A and the first metal layer 110B of the first mesh line ML1B and the second metal layer 120C of the second mesh line ML2D of this embodiment may be found in the relevant paragraphs of the foregoing embodiment and will not be repeated here.

In this embodiment, since a reflectivity of a surface ML2Ds of the second mesh line ML2D that faces the user USR is greater than a reflectivity of the surface ML1Bs of the first mesh line ML1B that faces the user USR, a width (not shown) of the second mesh line ML2D in this embodiment may optionally be smaller than a width (not shown) of the first mesh line ML1B, so that the visibility of the second mesh lines ML2D is reduced. In other words, by disposing the low-reflectivity layer 115A on a side, which faces the user USR, of the first mesh line ML1B that are closer to the user USR and reducing a width of the second mesh line ML2D that are farther from the user USR, the concealment of the first and second mesh pattern MP1B, MP2D may be facilitated.

On the other hand, in this embodiment, the low-reflectivity layer 116A and the low-reflectivity layer 115A of the first mesh line ML1B may optionally be a same low-reflectivity film layer, the first conductive portion BPa of the bonding pad BP and the first metal layer 110B of the first mesh line ML1B may optionally be a same metal film layer, and the second conductive portion BPb of the bonding pad BP and the second metal layer 120C of the second mesh line ML2C may optionally be a same metal film layer, but the disclosure is not limited thereto. Since there is no low-reflectivity layer with a high resistance disposed between the first conductive portion BPa and the second conductive portion BPb of the bonding pad BP, the touch-sensing panel 15 may be prevented from signal transmission problem between the bonding pad BP and a test probe or a circuit board when performing a test on the touch-sensing panel 15 or when the touch-sensing panel 15 is connected to the circuit board.

Figure 15:
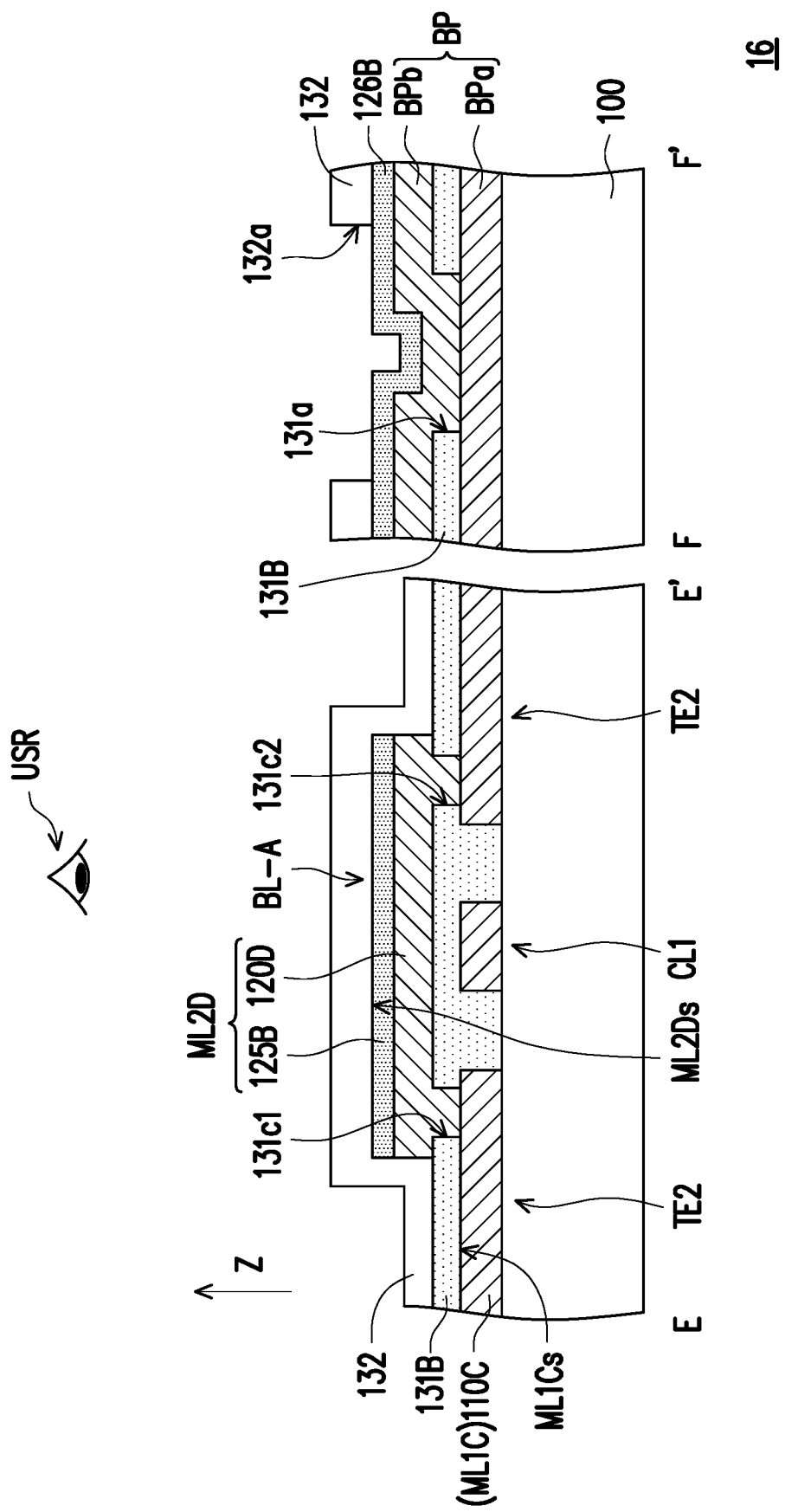
FIG. 15 is a schematic cross-sectional view of a touch-sensing panel according to a sixth embodiment of the disclosure.

FIG. 15 is a schematic cross-sectional view of a touch-sensing panel according to a sixth embodiment of the disclosure. It is to be noted that a front view of the touch-sensing panel of the sixth embodiment may be found in FIG. 13, and the marks 15, MP1B, and MP2C of the touch-sensing panel, the first mesh pattern, and the second mesh pattern in FIG. 13 are changed to 16, MP1C, and MP2D, respectively.

The main difference between a touch-sensing panel 16 of this embodiment and the touch-sensing panel 15 of the fifth embodiment (as shown in FIG. 14) is that the dispositions of the low-reflectivity layer in the two embodiments are different. Specifically, a touch surface of the touch-sensing panel 16 is located on a side of the substrate 100 where the first and second mesh patterns MP1C, MP2D are disposed. In other words, the user USR is located on the upper side of the substrate 100 in FIG. 15 to perform touch operations.

Similar to the fifth embodiment, the insulating layer 131B of the touch-sensing panel 16 of this embodiment has multiple contact holes 131c1 and multiple contact holes 131c2, and each of the contact holes 131c1, 132c2 overlaps and exposes a portion of a corresponding one of the second touch electrodes TE2. Each of multiple bridging lines BL-A overlaps a corresponding one of multiple connecting lines CL1 of the first mesh pattern MP1C, and each of the bridging lines BL-A electrically connects to adjacent two of the second touch electrodes TE2 via the contact hole 131c1 and the contact hole 131c2 of the insulating layer 131B.

The first touch electrodes TE1, the second touch electrodes TE2, and the connecting lines CL1 of this embodiment are formed by the multiple first mesh lines ML1C, and the bridging lines BL-A are formed by the multiple second mesh lines ML2D. Since the structures and materials of the first metal layer 110C of the first mesh line ML1C, the low-reflectivity layer 125B and the second metal layer 120D of the second mesh line ML2D of this embodiment are similar to the structures and materials of the first metal layer 110A of the first mesh line ML1A, the low-reflectivity layer 125 and the second metal layer 120A of the second mesh lines ML2A of the touch-sensing panel 11 of the second embodiment, a detailed description of the first metal layer 110C of the first mesh lines ML1C and the low-reflectivity layer 125B and the second metal layer 120D of the second mesh lines ML2D of this embodiment may be found in the relevant paragraphs of the foregoing embodiment and will not be repeated here.

In this embodiment, since a reflectivity of the surface ML1Cs of the first mesh line ML1C that faces the user USR is greater than a reflectivity of the surface ML2Ds of the second mesh line ML2D that faces the user USR, a width (not shown) of the first mesh line ML1C of this embodiment may be optionally smaller than a width (not shown) of the second mesh line ML2D, so that the visibility of the first mesh lines ML1C is reduced. In other words, by arranging the low-reflectivity layer 125B on the side, which faces the user USR, of the second mesh line ML2D that are closer to the user USR and reducing a line width of the first mesh line ML1C that are farther from the user USR, the concealment of the first mesh pattern MP1C and the second mesh pattern MP2D may be facilitated.

On the other hand, in this embodiment, the first conductive portion BPa of the bonding pad BP and the first metal layer 110C of the first mesh line ML1C may optionally be a same metal film layer, the second conductive portion BPb of the bonding pad BP and the second metal layer 120D of the second mesh line ML2D may optionally be a same metal film layer, and the low-reflectivity layer 126B and the low-reflectivity layer 125B of the second mesh line ML2D may optionally be a same low-reflectivity film layer, but the disclosure is not limited thereto.

In summary, in a touch-sensing panel of an embodiment of the disclosure, multiple first mesh lines and multiple second mesh lines are disposed on the substrate. When a reflectivity of a surface of the first mesh lines that faces the substrate is smaller than a reflectivity of a surface of the second mesh lines that faces the substrate, each width of the second mesh lines is smaller than each width of the first mesh lines. Conversely, when a reflectivity of a surface of the second mesh lines that faces away from the substrate is smaller than a reflectivity of a surface of the first mesh lines that faces away from the substrate, each of the widths of the first mesh lines is smaller than each of the widths of the second mesh lines. Accordingly, a low visibility of mesh patterns may be ensured, and a test yield of the touch-sensing panel and a bonding yield of the circuit board may be facilitated.

Finally, it is to be noted that the embodiments are only used to illustrate but not to limit the technical solutions of the disclosure; although the disclosure has been described in detail with reference to the embodiments, those of ordinary skill in the art should understand: it is still possible to modify the technical solutions described in the embodiments, or equivalently replace some or all of the technical features; and the modifications or replacements do not cause the essence of the corresponding technical solutions to deviate from the scope of the technical solutions of the embodiments of the disclosure.

What is claimed is:

1. A touch-sensing panel, comprising:
    a substrate, comprising an active area and a peripheral area;
    a first mesh pattern, wherein the first mesh pattern is disposed on the substrate and located in the active area;
    an insulating layer, disposed on the first mesh pattern; and
    a second mesh pattern, located in the active area, wherein at least a part of the second mesh pattern is disposed on the insulating layer;
    wherein each of the first mesh pattern and the second mesh pattern comprises a plurality of mesh lines, a reflectivity of a surface of the first mesh pattern is smaller than a reflectivity of a surface of the second mesh pattern, and a width of each of the mesh lines of the first mesh pattern is greater than a width of each of the mesh lines of the second mesh pattern, wherein each of the mesh lines of the first mesh pattern comprises a first metal layer and a low-reflectivity layer, the low-reflectivity layer is located between the first metal layer and the substrate, each of the mesh lines of the second mesh pattern comprises a second metal layer, wherein a reflectivity of the low-reflectivity layer is smaller than a reflectivity of a surface of the first metal layer that faces the substrate and a reflectivity of a surface of the second metal layer that faces the insulating layer.

2. The touch-sensing panel according to claim 1, wherein the low-reflectivity layer is a metal oxide layer.

3. The touch-sensing panel according to claim 2, wherein a material of the low-reflectivity layer comprises molybdenum, copper, aluminum, silver, and tantalum, or a combination thereof.

4. The touch-sensing panel according to claim 1, wherein when a user performs a touch operation on the touch-sensing panel, the user is located on a side of the substrate that faces away from the first mesh pattern and the second mesh pattern.

5. The touch-sensing panel according to claim 1, wherein the mesh lines of the first mesh pattern form a plurality of first touch electrodes, and the mesh lines of the second mesh pattern form a plurality of second touch electrodes.

6. The touch-sensing panel according to claim 1, wherein the mesh lines of the first mesh pattern form a plurality of first touch electrodes, a plurality of second touch electrodes, and a plurality of connecting lines, and the mesh lines of the second mesh pattern form a plurality of bridging lines, wherein two of the first touch electrodes that are adjacent to each other are electrically connected to each other via at least one of the connecting lines, and two of the second touch electrodes that are adjacent to each other are electrically connected to each other via at least one of the bridging lines.

7. A touch-sensing panel, comprising:
    a substrate, comprising an active area and a peripheral area;
    a first mesh pattern, wherein the first mesh pattern is disposed on the substrate and located in the active area;
    an insulating layer, disposed on the first mesh pattern; and
    a second mesh pattern, located in the active area, wherein at least a part of the second mesh pattern is disposed on the insulating layer;
    wherein each of the first mesh pattern and the second mesh pattern comprises a plurality of mesh lines, a reflectivity of a surface of the second mesh pattern is smaller than a reflectivity of a surface of the first mesh pattern, and a width of each of the mesh lines of the second mesh pattern is greater than a width of each of the mesh lines of the first mesh pattern, wherein each of the mesh lines of the first mesh pattern comprises a first metal layer, each of the mesh lines of the second mesh pattern comprises a second metal layer and a low-reflectivity layer, the second metal layer is located between the low-reflectivity layer and the insulating layer, wherein a reflectivity of the low-reflectivity layer is smaller than a reflectivity of a surface of the first metal layer that faces away from the substrate and a reflectivity of a surface of the second metal layer that faces away from the insulating layer.

8. The touch-sensing panel according to claim 7, wherein the low-reflectivity layer is a metal oxide layer.

9. The touch-sensing panel according to claim 8, wherein a material of the low-reflectivity layer comprises molybdenum, copper, aluminum, silver, and tantalum, or a combination thereof.

10. The touch-sensing panel according to claim 7, wherein when a user performs a touch operation on the touch-sensing panel, the user is located on a side of the substrate where the first mesh pattern and the second mesh pattern are disposed.

11. The touch-sensing panel according to claim 7, wherein the mesh lines of the first mesh pattern form a plurality of first touch electrodes, and the mesh lines of the second mesh pattern form a plurality of second touch electrodes.

12. The touch-sensing panel according to claim 7, wherein the mesh lines of the first mesh pattern form a plurality of first touch electrodes, a plurality of second touch electrodes, and a plurality of connecting lines, and the mesh lines of the second mesh pattern form a plurality of bridging lines, wherein two of the first touch electrodes that are adjacent to each other are electrically connected to each other via at least one of the connecting lines, and two of the second touch electrodes that are adjacent to each other are electrically connected to each other via at least one of the bridging lines.

\* \* \* \* \*